(12) United States Patent
Pugliese

(10) Patent No.: US 10,010,773 B1
(45) Date of Patent: Jul. 3, 2018

(54) GRIP ASSEMBLIES AND RELATED METHODS

(71) Applicant: Scott J. Pugliese, Portland, OR (US)

(72) Inventor: Scott J. Pugliese, Portland, OR (US)

(*) Notice: Subject to any disclaimer, the term of this patent is extended or adjusted under 35 U.S.C. 154(b) by 0 days.

(21) Appl. No.: 15/609,920

(22) Filed: May 31, 2017

(51) Int. Cl.
| | |
|---|---|
| *A63B 53/14* | (2015.01) |
| *A63B 60/14* | (2015.01) |
| *A63B 60/12* | (2015.01) |
| A63B 60/08 | (2015.01) |
| A63B 60/34 | (2015.01) |
| A63B 53/04 | (2015.01) |

(52) U.S. Cl.
CPC .............. *A63B 60/14* (2015.10); *A63B 60/12* (2015.10); *A63B 53/04* (2013.01); *A63B 53/14* (2013.01); *A63B 60/08* (2015.10); *A63B 60/34* (2015.10)

(58) Field of Classification Search
CPC .......... A63B 53/14; A63B 60/06; A63B 60/14
USPC ................................. 473/298–299
See application file for complete search history.

(56) References Cited

U.S. PATENT DOCUMENTS

| | | | |
|---|---|---|---|
| 740,500 | A | 10/1903 | White |
| 1,565,076 | A | 1/1925 | Fink |
| 1,556,473 | A | 10/1925 | Ballou |
| 1,580,724 | A | 4/1926 | Harmon |
| 1,664,257 | A | 3/1928 | McCullough |
| 1,665,811 | A | 4/1928 | Hadden |
| 2,133,696 | A | 10/1938 | Hall |
| 2,871,899 | A | 2/1959 | Coyle et al. |
| 2,949,304 | A | 8/1960 | Williams |
| 3,001,220 | A * | 9/1961 | Canning ............. B05C 17/0207 15/230.11 |
| 3,087,729 | A | 4/1963 | Sullivan |
| 3,410,017 | A | 11/1968 | Wilson |
| 3,638,943 | A | 2/1972 | Snauwaert |
| 3,964,340 | A | 6/1976 | Antonio et al. |
| 4,819,939 | A | 4/1989 | Kobayashi |
| 4,826,168 | A | 5/1989 | McGuire et al. |
| 4,878,667 | A | 11/1989 | Tosti |
| 5,398,934 | A | 3/1995 | Soong |
| 5,419,031 | A | 5/1995 | McLendon |
| 5,478,074 | A | 12/1995 | Storper |
| 5,513,845 | A | 5/1996 | Sonagere |
| 5,575,724 | A | 11/1996 | Hannon et al. |
| 5,730,662 | A | 3/1998 | Rens |

(Continued)

*Primary Examiner* — Melba Bumgarner
*Assistant Examiner* — Laura L Davison
(74) *Attorney, Agent, or Firm* — Dascenzo Intellectual Property Law, P.C.

(57) ABSTRACT

Presently disclosed grip assemblies provide for a selectively removable and replaceable grip for a shaft. Such grip assemblies include a grip sleeve and a grip liner at least partially fixed to an inner grip surface of the grip sleeve. The grip liner is configured to expand between a resting conformation and an expanded conformation as the grip sleeve and grip liner are positioned on the shaft. The grip liner includes a liner feature that engages a shaft feature, which may be integrally formed on the shaft, or may be formed on a shaft sheath on the shaft. Engagement of the liner feature with the shaft feature may substantially prevent rotation of the grip sleeve with respect to the shaft once the grip sleeve is on the shaft. Presently disclosed grip sleeves may be selectively removed from the shaft without damaging the grip sleeve, and without requiring solvents or specialized tools.

21 Claims, 8 Drawing Sheets

(56) References Cited

U.S. PATENT DOCUMENTS

| | | | |
|---|---|---|---|
| 5,816,960 A | 10/1998 | Svoma et al. | |
| 6,235,134 B1 | 5/2001 | Mueller | |
| 6,685,583 B2 * | 2/2004 | Severa | A63B 49/08 |
| | | | 473/523 |
| 6,823,562 B1 | 11/2004 | Smith et al. | |
| 7,347,121 B2 | 3/2008 | Wu | |
| 7,458,902 B2 | 12/2008 | Gill | |
| 7,582,023 B2 | 9/2009 | Hung | |
| 7,713,137 B2 | 5/2010 | Doerr | |
| 7,798,911 B2 | 9/2010 | Gill | |
| 7,814,812 B1 | 10/2010 | Ziegahn et al. | |
| 8,182,361 B2 | 5/2012 | Gill | |
| 8,348,783 B2 | 1/2013 | Soracco et al. | |
| 8,419,566 B2 | 4/2013 | Gill | |
| 8,747,247 B2 | 6/2014 | Beach et al. | |
| 8,814,719 B2 | 8/2014 | Wall, Jr. | |
| 8,834,288 B2 * | 9/2014 | Aguinaldo | A63B 53/10 |
| | | | 403/109.1 |
| 9,138,623 B2 | 9/2015 | Wall, Jr. | |
| 9,174,104 B1 | 11/2015 | Rogacki | |
| 9,656,133 B1 * | 5/2017 | Chalifoux | A63B 53/14 |
| 2014/0378242 A1 | 12/2014 | Chalifoux | |
| 2015/0190690 A1 * | 7/2015 | Stephenson | A63B 60/10 |
| | | | 16/422 |
| 2015/0196814 A1 * | 7/2015 | Chu | A63B 53/14 |
| | | | 473/300 |
| 2015/0231462 A1 | 8/2015 | Chapin | |

* cited by examiner

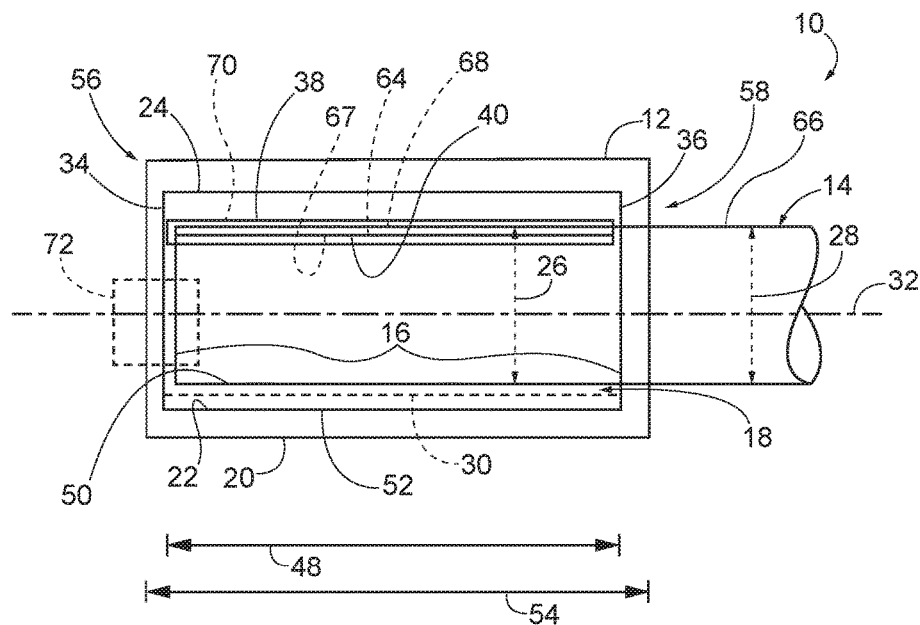
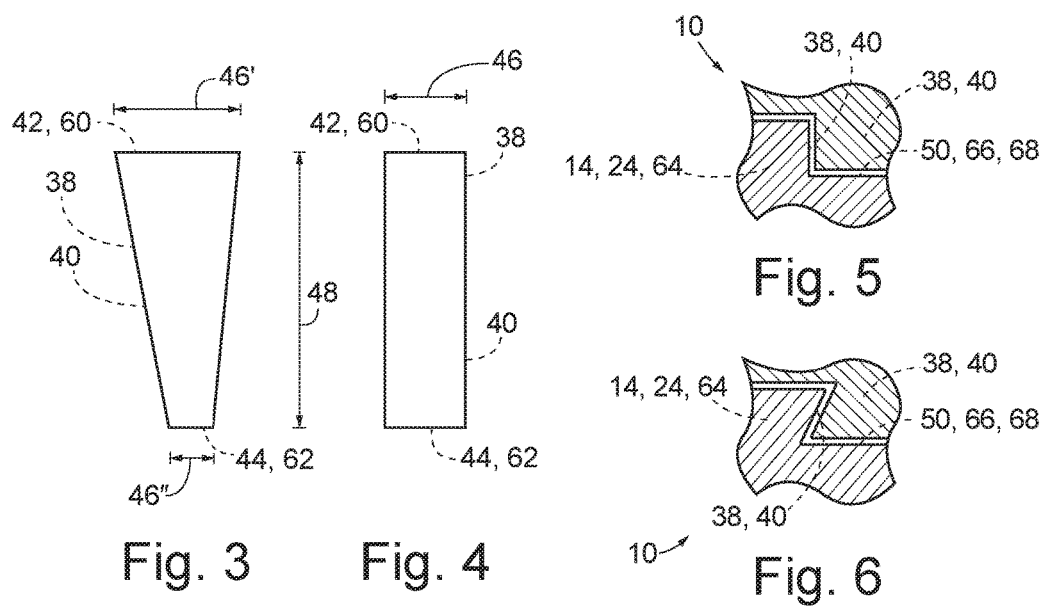
Fig. 1
Fig. 3   Fig. 4
Fig. 5
Fig. 6

GRIP ASSEMBLIES AND RELATED METHODS

FIELD

The present disclosure relates to grip assemblies and related methods.

BACKGROUND

Handle portions of sports and recreational equipment often include a grip for improved handling and/or for shock absorption. These grips may be constructed of flexible materials such as leather, rubber, or other synthetic materials. Conventional grips may be wrapped around the handle and glued in place, or molded grips may be installed using tapes and solvents. In either case, typical users of the grips may not possess the skill required to apply the grips properly, and/or removal of the grips may be difficult and/or time consuming. Some conventional grips require specialized equipment for removal, such as air compressors. Removal of the grip is often a destructive process.

Previous attempts at providing a removable grip that may be removed and replaced in less time and/or with less skill have been unsuccessful in some applications. For example, in the case of golf club grips, previous attempts have been expensive, too large to fit the golf club shaft properly, do not conform to the taper of the golf club shaft, do not preserve the tapered shape of the golf club shaft, add a significant amount of weight to the golf club, and/or still require the use of specialized tools.

SUMMARY

Presently disclosed grip assemblies may address these and other shortcomings in the prior art. Examples of grip assemblies according to the present disclosure may allow for quicker and easier removal and replacement of grips, as compared to prior art grips. In some examples, grip assemblies according to the present disclosure may be removed and/or placed onto a shaft or handle without the use of sharp tools, chemicals (e.g., solvents), or tape. In some examples, the equipment may be used immediately after placement of the grip assembly, rather than having to wait for adhesives or other chemicals to dry, as may be the case with prior art grips. Similarly, presently disclosed grip assemblies may be relatively inexpensive, conform to the desired shape (e.g., the tapered shape of a golf club shaft), add minimal weight to the shaft or handle, and/or fit within the space constraints of the particular application.

In one example according to the present disclosure, a grip assembly includes a grip sleeve and a grip liner, a portion of which is fixed, or attached, to an inner grip surface of the grip sleeve. The grip sleeve defines an interior space and is configured to be selectively positioned on a shaft such that a portion of the shaft is within the interior space. The grip sleeve is further configured to be selectively removed from the shaft. The grip sleeve comprises an outer grip surface for engagement by a user, and the inner grip surface opposite the outer grip surface that faces the interior space. The grip sleeve generally is constructed of a resilient material.

The grip liner is partially fixed, or attached, with respect to the grip sleeve such that it is configured to radially expand in response to an outward radial force exerted on the grip liner, from a resting conformation to an expanded conformation. The grip liner may be substantially tubular in overall shape (e.g., in the resting conformation) and includes a discontinuity and a liner feature that extend longitudinally along a longitudinal axis of the grip liner. The discontinuity facilitates radial expansion and contraction of the grip liner between the resting conformation and the expanded conformation. The liner feature is configured to mate with a shaft feature associated with the shaft and restrict rotation of the grip sleeve relative to the shaft when the shaft is positioned within the interior space (and therefore when the liner feature and the shaft feature are mated).

Kits including such grip assemblies are also disclosed, and include a shaft sheath that is configured to be positioned between the grip sleeve and the shaft, such as to retrofit a shaft (e.g., a golf club shaft) to include the selectively removable and replaceable grip sleeve. The shaft sheath is configured to be positioned adjacent the shaft such that an inner sheath surface is coupled to the shaft, and the shaft feature is provided on an outer sheath surface opposite the inner sheath surface.

Golf clubs are also disclosed, such as golf clubs that include presently disclosed grip assemblies positioned on a portion of the golf club shaft.

Methods of replacing a grip on a shaft are also disclosed. Methods generally include providing a grip assembly according to the present disclosure and positioning the grip sleeve of the grip assembly on the shaft, such as by sliding the grip sleeve onto the shaft while engaging the liner feature and the shaft feature. Such methods may additionally include securing the grip sleeve with respect to the shaft using a securement mechanism.

Methods of assembling, or constructing, a selectively replaceable grip assembly may include providing a grip sleeve, and securing a grip liner adjacent the inner grip surface of the grip sleeve, thus forming a grip assembly according to the present disclosure.

BRIEF DESCRIPTION OF THE DRAWINGS

FIG. 1 is a schematic representation of non-exclusive examples of grip assemblies according to the present disclosure.

FIG. 3 is a schematic representation of a top plan view of one example of a suitable shape for a liner feature and/or a shaft feature for grip assemblies according to the present disclosure.

FIG. 4 is a schematic representation of a top plan view of another example of a suitable shape for a liner feature and/or a shaft feature for grip assemblies according to the present disclosure.

FIG. 5 is a schematic, partial cross-sectional view of a portion of a liner feature or shaft feature for grip assemblies according to the present disclosure.

FIG. 6 is a schematic, partial cross-sectional view of a portion of a liner feature or shaft feature for grip assemblies according to the present disclosure, having undercut edges.

DESCRIPTION

Figure 2:
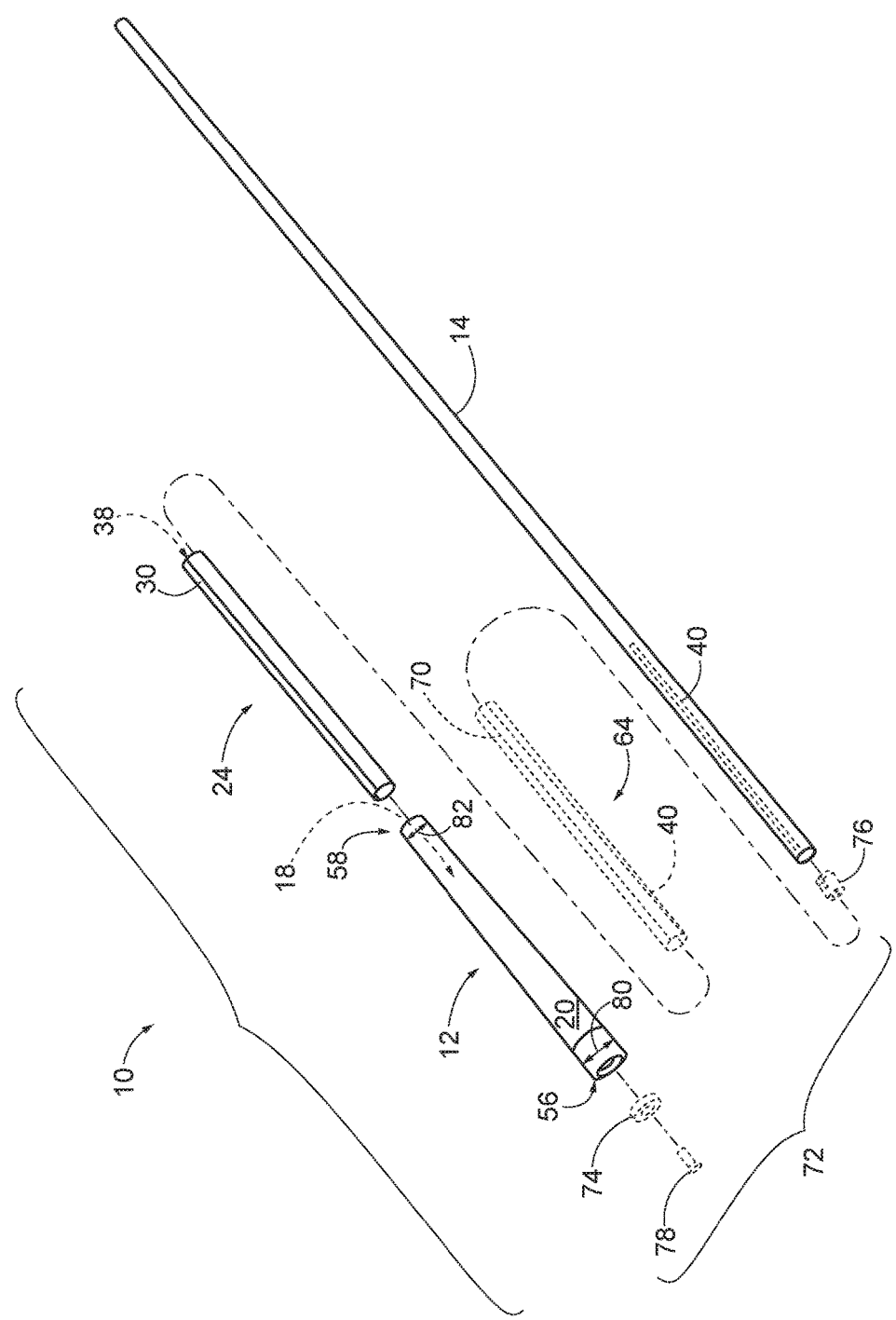
FIG. 2 is a perspective, exploded schematic view of non-exclusive examples of grip assemblies according to the present disclosure.

FIGS. 1-25 provide examples of grip assemblies 10 according to the present disclosure, kits 140 including the same, and/or components of grip assemblies 10. Elements that serve a similar, or at least substantially similar, purpose are labeled with like numbers in each of FIGS. 1-25, and these elements may not be discussed in detail herein with reference to each of FIGS. 1-25. Similarly, all elements may not be labeled in each of FIGS. 1-25, but reference numerals associated therewith may be utilized herein for consistency. Elements, components, and/or features that are discussed herein with reference to one or more of FIGS. 1-25 may be included in and/or utilized with any of FIGS. 1-25 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIGS. 1-7 schematically illustrate grip assemblies 10, or portions or components thereof. With reference to FIGS. 1-2, a grip sleeve 12 according to the present disclosure is shown positioned on shaft 14, such that a portion 16 (FIG. 1) of shaft 14 is positioned within an interior space 18 defined by grip sleeve 12 (though in some examples the entire shaft 14 may be positioned within interior space 18) in FIG. 1. Grip assembly 10 (which includes shaft 14, in some examples) is shown in an exploded view in FIG. 2. Grip sleeve 12 is configured to be selectively positioned on shaft 14, and further configured to be selectively removed from shaft 14. For example, grip sleeve 12 may be positioned on shaft 14 (and removed therefrom) without damaging grip sleeve 12, without the use of solvents or adhesives, and/or without the use of specialized tools, such as air compressors. In this manner, once selectively removed, grip sleeve 12 may be reused and selectively placed onto the same or a different shaft 14.

Grip sleeve 12 includes an outer grip surface 20 for engagement by a user. For example, a user may grip, or hold, shaft 14 via outer grip surface 20 such that the user contacts outer grip surface 20 when using shaft 14. Grip sleeve 12 includes an inner grip surface 22 that is opposite outer grip surface 20, such that inner grip surface 22 faces interior space 18. Grip sleeve 12 is generally constructed of a resilient material (e.g., rubber or another polymer) and may be configured to provide a non-stick grip for a user, and/or may provide some cushioning or impact-absorption between the user's hand and shaft 14. In some examples, grip sleeve 12 may be formed of an elastic material.

Grip assembly 10 includes a grip liner 24 positioned adjacent inner grip surface 22, such that grip liner 24 is positioned interiorly to grip sleeve 12 (e.g., grip liner 24 is positioned between grip sleeve 12 and shaft 14 when grip sleeve 12 is positioned on shaft 14). Grip liner 24 is radially expandable between a resting conformation and an expanded conformation and is substantially tubular in overall shape in some examples. As used herein, "substantially tubular" refers to objects that are elongated and hollow, which may or may not have a circular cross-sectional area. Tapered or frustoconical objects are within the scope of "substantially tubular," as used herein.

In some examples, only a portion of grip liner 24 is fixed, directly attached, directly coupled to, or otherwise directly secured to grip sleeve 12 (e.g., to inner grip surface 22), so as to allow expansion of grip liner 24 towards the expanded conformation when an outward radial force is exerted on grip liner 24 from within. As grip liner 24 expands to the expanded conformation, the volume within grip liner 24 increases, and/or an inner diameter 26 of grip liner 24 increases. Grip liner 24 is at least partially fixed with respect to grip sleeve 12, so as to substantially prevent rotation of grip liner 24 relative to grip sleeve 12, which in turn facilitates proper alignment of grip sleeve 12 with shaft 14, as will be described in further detail, below. If grip liner 24 is free to rotate with respect to grip sleeve 12, then such respective alignment may be compromised, but if grip liner 24 is entirely fixed within grip sleeve 12, then expansion of grip liner 24 towards the expanded conformation may be hampered or undesirably prevented, such as due to the material properties of grip sleeve 12. Thus, in some examples, grip liner 24 is only partially fixed within, or coupled to grip sleeve 12, so as to substantially prevent rotation of grip liner 24 with respect to grip sleeve 12, but to also allow for expansion of grip liner 24 towards the expanded conformation. That said, in some examples of grip assembly 10, an entirety of an outer liner surface 52 of the grip liner 24 may be fixed to inner grip surface 22 of grip sleeve 12, with the resilience of grip sleeve 12 facilitating expansion of grip liner 24 towards the expanded conformation.

In some examples, grip liner 24 is adhered, welded, molded into, or otherwise secured to grip sleeve 12 (e.g., to inner grip surface 22) along one or more lines that extend longitudinally along grip liner 24, and/or in discrete spaced-apart positions on grip liner 24. For example, adhesive may be applied in a continuous longitudinally-extending line to adhere at least a portion of grip liner 24 to the interior of grip sleeve 12. In some examples, adhesive may be applied in a broken line that extends longitudinally along grip liner 24. Additionally or alternatively, grip liner 24 may be secured to grip sleeve 12 at one or both ends of grip liner 24, and/or in positions therebetween.

Inner diameter 26 of grip liner 24 in the resting conformation may be less than a diameter 28 of shaft 14 onto which grip assembly 10 is configured to be placed in some examples. When grip sleeve 12 and grip liner 24 are positioned onto shaft 14, the diameter of grip liner 24 may expand towards the expanded conformation in order to accommodate shaft 14 within grip sleeve 12 and grip liner 24. Grip liner 24 may be elastic or biased towards the resting conformation (e.g., may be formed of a shape memory material or may be formed of a rigid, semi-rigid, and/or elastic material) such that when the outward radial force is removed, grip liner 24 returns to the resting conformation. In some examples, grip liner 24 is formed of polyethylene terephthalate (PET), polyethylene (PE), polypropylene (PP), polyvinyl chloride (PVC), polycarbonate (PC), polytetrafluoroethylene (PTFE), and/or polyethylene terephthalate glycol-modified (PETG).

To facilitate such radial expansion, grip liner 24 includes a discontinuity 30 that extends longitudinally along a longitudinal axis 32 of grip liner 24. In some examples, discontinuity 30 may extend the entire length of grip liner 24, such as from a first liner end 34 to a second liner end 36 opposite first liner end 34, while in other examples, discontinuity 30 may extend only a portion of the length of grip liner 24. For example, in some examples, discontinuity 30 may not be necessary toward a first liner end 34 (corresponding to a butt end region 56 of grip sleeve 12), in so far as first liner end 34 and butt end region 56 need not expand, or expand significantly, to overcome a diameter 28 of shaft 14.

Discontinuity 30 is, in some examples, a longitudinal gap formed in grip liner 24 such that the gap widens as grip liner 24 expands towards the expanded conformation, and shortens as grip liner 24 returns towards the resting conformation. In other examples, discontinuity 30 may be a slit formed in grip liner 24, such that there is substantially no such gap or separation when grip liner 24 is in the resting conformation. When present, the longitudinal gap or slit may extend along the entire length of grip liner 24, or may extend along just a portion of the length of grip liner 24. Additionally or alternatively, discontinuity 30 may include a flexible member (e.g., elastic webbing or similar material) spanning a slit or other discontinuity.

In some examples, discontinuity 30 may include an area of overlap between two or more layers that form grip liner 24. Grip liner 24 may include a single discontinuity 30, or may include a plurality of discontinuities 30, which may be circumferentially spaced apart about grip liner 24 and/or may be longitudinally spaced apart along the length of grip liner 24.

Grip liner 24 also includes a liner feature 38 that extends longitudinally along grip liner 24 (e.g., along longitudinal axis 32 of grip liner 24). Liner feature 38 is configured to mate with a corresponding shaft feature 40 associated with shaft 14 when grip sleeve 12 and grip liner 24 are positioned on shaft 14. For example, one of liner feature 38 and shaft feature 40 may be a ridge (which also may be referred to as a projection), and the other of liner feature 38 and shaft feature 40 may be a channel (which also may be referred to as a groove, a depression, or a recess). In some examples, liner feature 38 is a channel (e.g., a depression extending radially outward) and shaft feature 40 is a corresponding ridge (e.g., a projection extending radially outward) that fits at least partially within the channel-shaped liner feature 38. In other examples, liner feature 38 is a ridge (e.g., a projection extending radially inward) that fits at least partially within a channel-shaped shaft feature 40. Shaft feature 40 and liner feature 38 may be sized and shaped correspondingly such that they are configured to engage with one another when grip sleeve 12 is positioned on shaft 14. Liner feature 38 and shaft feature 40 may be respectively sized and shaped such that engagement of the two restricts rotation of grip sleeve 12 relative to shaft 14 when shaft 14 is positioned within interior space 18 (and hence liner feature 38 and shaft feature 40 are mated). In some examples, engagement of liner feature 38 and shaft feature 40 substantially prevents rotation of grip sleeve 12 with respect to shaft 14. In some examples, discontinuity 30 may serve as liner feature 38. For example, discontinuity 30 may be an expandable channel in some examples, that allows for expansion of grip liner 24 towards the expanded conformation, and also engages with shaft feature 40.

Similar to discontinuity 30, liner feature 38 may extend along the entire length of grip liner 24 (e.g., from first liner end 34 to second liner end 36), or may extend along only a portion of the length of grip liner 24. Liner feature 38 may have a substantially constant width (e.g., arc length) along its length in some examples. In other examples, liner feature 38 may be tapered such that its width continuously decreases along its length. For example, FIG. 3 schematically illustrates a top plan view of a suitable shape for liner feature 38 that tapers from a first liner feature end 42 (which corresponds to first liner end 34, in some examples) to a second liner feature end 44 (which corresponds to a second liner end 36, in some examples), or vice versa. In other words, in the wedge-shaped or tapered shape shown in FIG. 3, a width 46 of liner feature 38 may be at a maximum value 46' at or toward first liner feature end 42, and may decrease to width 46" (e.g., the minimum value) at or toward second liner feature end 44, with width 46 decreasing continuously along the length 48 of liner feature 38. By contrast, FIG. 4 illustrates a top plan view of another suitable shape (e.g., a rectangular shape) for liner feature 38, having a substantially constant width 46 along length 48 of liner feature 38. FIGS. 3-4 also represent suitable and corresponding shapes for shaft feature 40, as discussed below.

Returning to FIGS. 1-2, grip liner 24 may include a single liner feature 38, or may include a plurality of liner features 38. In some examples, liner feature 38 overlaps discontinuity 30, as will be explained in further detail with respect to FIGS. 8-16. In other examples, liner feature 38 is circumferentially spaced apart from discontinuity 30. As also will be explained in further detail with respect to FIGS. 8-16, grip liner 24 may include multiple layers which may overlap and/or form liner feature 38.

Grip liner 24 may include an inner liner surface 50 and an outer liner surface 52 opposite inner liner surface 50. At least a portion of outer liner surface 52 may be coupled to (e.g., adhered to) inner grip surface 22 of grip sleeve 12, or grip liner 24 may be integrally formed with grip sleeve 12. Liner feature 38 may be formed or positioned on inner liner surface 50.

For example, in grip assemblies 10 where liner feature 38 is a channel, liner feature 38 may be an area of decreased thickness or a recession formed in inner liner surface 50. In examples where liner feature 38 is a ridge, liner feature 38 may be an area of increased thickness or a projection extending radially inward from inner liner surface 50.

Grip liner 24 may extend along substantially an entire sleeve length 54 of grip sleeve 12. For example, grip liner 24 may extend from a butt end region 56 of grip sleeve 12 to a tapered end region 58 of grip sleeve 12, the tapered end region 58 being opposite butt end region 56. In other examples, grip liner 24 may extend along just a portion of length 54 of grip sleeve 12.

Similar to liner feature 38, shaft feature 40 may have a substantially constant width (e.g., arc length) along its length in some examples. In other examples, shaft feature 40 may be tapered such that its width continuously decreases along its length. For example, FIG. 3 schematically illustrates a top plan view of a suitable shape for shaft feature 40 that tapers from a first shaft feature end 60 to a second shaft feature end 62. In other words, in the tapered shape shown in FIG. 3, a width 46 of shaft feature 40 may be at a maximum value 46' at or toward first shaft feature end 60, and may decrease to width 46" (e.g., the minimum value) at or toward second shaft feature end 62, with width 46 decreasing continuously along the length 48 of shaft feature 40. By contrast, FIG. 4 illustrates a top plan view of another suitable shape for shaft feature 40, having a substantially constant width 46 along length 48 of shaft feature 40.

Returning to FIGS. 1-2, grip assembly 10 may include a single shaft feature 40, or may contain a plurality of shaft features 40. In some examples, shaft feature 40 is integrally formed in or on shaft 14 (e.g., shaft feature 40 may be a channel integrally formed into shaft 40, or may be a ridge integrally formed on shaft 14). For example, shaft feature 40 may be formed by a decreased thickness portion of shaft 14 (e.g., when shaft feature 40 is a channel), or by an increased thickness portion of shaft 14 (e.g., when shaft feature 40 is a ridge). In other examples, grip assembly 10 may include a shaft sheath 64 that includes shaft feature 40. Such shaft sheath 64 may be coupled to shaft 14 or integrally formed with shaft 14. In examples of grip assembly 10 including shaft sheath 64, shaft feature 40 may be formed by a region of overlap between layers of shaft sheath 64 (e.g., in examples where shaft feature 40 is a ridge), or by spaced apart regions of overlap between layers of shaft sheath 64 (e.g., in examples where shaft feature 40 is a channel). As used herein, shaft feature 40 is said to be "associated with" shaft 14 whether shaft feature 40 is integrally formed with shaft 14, or whether shaft feature 40 is provided by a structure coupled to shaft 14 (e.g., shaft sheath 64).

Shaft 14 may include an outer shaft surface 66, and shaft sheath 64 may be positioned adjacent to and coupled to (e.g., adhered to) outer shaft surface 66, such that shaft sheath 64 is positioned interiorly to grip sleeve 12 and grip liner 24 when grip sleeve 12 and grip liner 24 are positioned on shaft 14. In other words, an inner sheath surface 67 may be adhered to shaft 14. In some examples, shaft sheath 64 is an adhesive-backed film applied to shaft 14. Shaft feature 40 may be formed or positioned on an outer sheath surface 68 of shaft sheath 64, the outer sheath surface 68 being opposite inner sheath surface 67. For example, in grip assemblies 10 where shaft feature 40 is a channel, shaft feature 40 may be an area of decreased thickness or a recession formed in outer sheath surface 68. In examples where shaft feature 40 is a ridge, shaft feature 40 may be an area of increased thickness or a projection extending radially outward from outer sheath surface 68. In grip assemblies including shaft sheath 64, shaft sheath 64 may be flexible and configured to conform to shaft 14. In some examples, shaft sheath 64 may have a nominal thickness, such as a thickness of less than about 0.001 inches, less than about 0.01 inches, less than about 0.025 inches, and/or less than about 0.1 inches. Shaft sheath 64 may be formed of any suitable materials, such as ultrahigh molecular weight polyethylene (UHMW PE), vinyl, polycarbonate (PC), polyethylene terephthalate (PET), polyethylene glycol modified (PETG), and/or polytetrafluoroethylene (PTFE).

In grip assemblies 10 including shaft sheath 64, shaft sheath 64 and grip liner 24 may be formed of materials configured to limit friction between said shaft sheath 64 and grip liner 24. In other words, grip liner 24 and shaft sheath 64 may be in physical contact with one another as grip sleeve 12 is positioned on shaft 14, and correspondingly, respective materials may be selected such that the coefficient of friction between grip liner 24 (e.g., inner liner surface 50) and shaft sheath 64 (e.g., outer sheath surface 68) is less than 0.7, less than 0.5, less than 0.4, less than 0.3, less than 0.2, less than 0.1, and/or less than 0.05, in order to facilitate positioning of grip sleeve 12 onto shaft 14. Additionally or alternatively, respective materials for grip liner 24 and shaft sheath 64 may be selected so that the force (e.g., the pulling or pushing forward along longitudinal axis 32) required to install and/or remove grip sleeve 12 and associated grip liner 24 from shaft 14 is less than 60 pounds, less than 50 pounds, less than 40 pounds, less than 30 pounds, and/or less than 20 pounds. Typically, grip liner 24 and shaft sheath 64 are formed of different respective materials, though they may be formed of the same material in some examples.

Once applied to shaft 14, shaft sheath 64 is generally prevented from moving or rotating with respect to shaft 14, such that shaft sheath 64 and shaft feature 40 are substantially fixed with respect to shaft 14 as grip liner 24 and grip sleeve 12 of grip assembly 10 are slid into position on shaft 14. In this manner, engagement of liner feature 38 of grip liner 24 with shaft feature 40 (whether shaft feature 40 is formed directly on shaft 14 or provided by shaft sheath 64 on shaft 14) can substantially ensure proper alignment of grip sleeve 12 with respect to shaft 14 as grip sleeve 12 is being placed onto shaft 14. Such engagement of liner feature 38 with shaft feature 40 can also substantially prevent rotation of grip sleeve 12 with respect to shaft 14, once grip sleeve 12 is placed on shaft 14. On the other hand, grip sleeve 12 is also selectively removable from shaft 14 by sliding grip sleeve 12 (and attached grip liner 24) with respect to shaft 14 and/or shaft sheath 64.

In some examples, grip assembly 10 includes an alignment guide 70. For example, shaft sheath 64 may include alignment guide 70, or shaft 14 may include alignment guide 70. Alignment guide 70 may be configured to facilitate proper alignment of shaft sheath 64 with respect to shaft 14. Additionally or alternatively, alignment guide 70 may be configured to facilitate proper alignment of grip sleeve 12 with respect to shaft 14 (and/or with respect to other components or features attached to shaft 14, such as a club head), such as during placement of grip sleeve 12 onto shaft 14. For example, grip sleeve 12 may not be radially symmetrical and alignment guide 70 may be configured to facilitate alignment of grip sleeve 12 with respect to shaft 14 in a desired orientation. In some examples, proper alignment of shaft sheath 64 with respect to shaft 14 (facilitated by alignment guide 70) may, in turn, have a secondary effect of aligning grip sleeve 12 with respect to shaft 14, by ensuring the desired alignment of shaft feature 40 on shaft sheath 64 with respect to shaft 14.

In one specific example, shaft 14 may be a golf club shaft, with a golf club head secured to the shaft opposite grip sleeve 12. In this case, grip sleeve 12 may need to be aligned with respect to the golf club head for proper use, such as associated with indicia or grip patterns associated with the outer surface of grip sleeve 12. Accordingly, alignment guide 70 may be configured to enable proper positioning of shaft sheath 64 and/or grip sleeve 12 with respect to shaft 14 and the attached golf club head. In some examples, alignment guide 70 may be a visible line or guide printed on, formed on, and/or encapsulated within shaft sheath 64. In some examples, alignment guide 70 is encapsulated between layers of shaft sheath 64. In some examples, alignment guide 70 is associated directly with shaft 14 (e.g., printed or otherwise applied on shaft 14, or formed in or on shaft 14).

With reference to FIG. 2, grip assembly 10 may include a securement mechanism 72 for selectively securing grip sleeve 12 to shaft 14. While grip sleeve 12 may fit tightly on shaft 14 (e.g., grip sleeve 12 may be configured to direct a force radially inward towards shaft 14 when grip sleeve 12 is positioned on shaft 14), and engagement between liner feature 38 and shaft feature 40 may sufficiently prevent rotation of grip sleeve 12 with respect to shaft 14, securement mechanism 72 may be configured to substantially prevent longitudinal movement of grip sleeve 12 with respect to shaft 14, once grip sleeve 12 is positioned on shaft 14 and securement mechanism 72 is secured. In examples including securement mechanism 72, securement mechanism 72 may include any suitable mechanisms. For example, securement mechanism 72 may include a sleeve collar 74 associated with grip sleeve 12, a threaded shaft plug 76 positioned and secured within shaft 14, and/or a fastener 78 configured to extend through sleeve collar 74 and be threaded into shaft plug 76. Sleeve collar 74 may be rigid and positioned within butt end region 56 of grip sleeve 12. Sleeve collar 74, when present, may be molded into grip sleeve 12 (e.g., integrally formed therewith), of the same material as grip sleeve 12, of a different durometer than the material of grip sleeve 12, insert molded into grip sleeve 12, and/or a separate component that is coupled to grip sleeve 12. In some examples, sleeve collar 74 may be arranged with respect to grip sleeve 12 such that sleeve collar 74 is permitted to move with respect to grip sleeve 12 but yet is prevented from being fully removed from grip sleeve 12 without damage to grip sleeve 12 and/or to sleeve collar 74.

In other examples, sleeve collar 74 may be associated with grip sleeve 12 such that sleeve collar 74 is substantially prevented from moving with respect to grip sleeve 12. Other suitable securement mechanisms 72 may include one or more of a screw and plug, a solid shaft having a threaded lug, a nut and bolt, a cam, a clamp, a clip, a ratchet mechanism, an expanding plug, and/or locking corresponding features.

Grip assembly 10 may be configured such that grip sleeve 12 may be selectively removed from shaft 14 without damage to grip sleeve 12, and thus later may be positioned on a second shaft after removal from shaft 14. Additionally or alternatively, grip sleeve 12 may be later reused and re-placed onto shaft 14 after it is selectively removed from shaft 14. In some examples, grip sleeve 12 may be selectively positioned on and removed from shaft 14 by hand, advantageously without the use of compressed air, special tools, or solvents. Presently disclosed grip assemblies 10 may therefore provide a cost-effective and time-effective way to change and replace grips on shaft 14. Additionally or alternatively, some presently disclosed grip assemblies 10 may favorably affect the vibrational characteristics of shaft 14 as experienced by a user, which may lessen the shock (e.g., impact force) imparted to the user when using shaft 14 with said grip assemblies 10.

Shaft 14 may be any shaft where it may be desirable to have a grip that is selectively removable and replaceable according to the present disclosure. In some examples, shaft 14 is frustoconical and/or tapered, such that its width or diameter becomes consistently smaller traversing along the shaft towards one end of shaft 14. Shaft 14 may be, for example, a shaft of a sports club or sports stick, or a handle for athletic equipment. In one specific example, shaft 14 is a golf club shaft for a golf club that tapers in diameter towards the end of the shaft adjacent the club head. Thus, grip sleeve 12 may be a grip for a golf club or other sports club or stick, in some examples.

In some examples, and as best seen in FIG. 2, grip sleeve 12 is tapered, such that a first grip sleeve diameter 80 at butt end region 56 is greater than a second grip sleeve diameter 82 at tapered end region 58. Second grip sleeve diameter 82 may be smaller than a diameter of shaft 14 at the location where grip sleeve 12 is first placed onto shaft 14. Thus, tapered end region 58 of grip sleeve 12 may temporarily expand (which may be facilitated by expansion of grip liner 24 towards the expanded conformation) to be passed over shaft 14, as grip sleeve 12 is positioned on shaft 14.

In other examples, grip sleeve 12 is not tapered at least when viewed from outer grip surface 20. In yet other examples, grip sleeve 12 may have a reverse taper when viewed from outer grip surface 20 (e.g., the grip sleeve diameter at butt end region 56 may be less than the grip sleeve diameter at 'tapered end region' 58). In any of these examples, inner grip surface 22 of grip sleeve 12 may be tapered to correspond to the tapered shape of shaft 14, or may be non-tapered or reverse tapered in accordance with the respective configuration of outer grip surface 20 in the given example. For example, inner grip surface 22 of the grip sleeve may be tapered such that it has a non-constant inner diameter, while outer grip surface 20 may not be tapered, such that it has a substantially constant diameter along its length.

As shown in FIGS. 5-6, liner feature 38 and/or shaft feature 40 may be undercut (FIG. 6), or may be normal (FIG. 5) to the surface from which or into which it extends. FIG. 5 schematically represents both shaft features 40 (which may be formed in or on shaft 14 or shaft sheath 64) and liner features 38 that are formed normal to the respective surface.

For example, liner feature 38 may be a ridge that extends normal to inner liner surface 50 of grip liner 24, and shaft feature 40 may be a corresponding channel that is formed normal to outer shaft surface 66 of shaft 14, or normal to outer sheath surface 68 of shaft sheath 64. Alternatively, liner feature 38 may be a channel that is formed normal to inner liner surface 50, and shaft feature 40 may be a ridge that extends normal to outer shaft surface 66 or outer sheath surface 68.

Similarly, FIG. 6 schematically represents both shaft features 40 (which may be formed in or on shaft 14 or shaft sheath 64) and liner features 38 that are undercut with respect to the respective surface, that is, that the sidewalls of the features are at an acute angle relative to the adjacent surfaces. For example, liner feature 38 may be a ridge that is undercut with respect to inner liner surface 50 of grip liner 24, and shaft feature 40 may be a corresponding channel that is undercut with respect to outer shaft surface 66 of shaft 14, or undercut with respect to outer sheath surface 68 of shaft sheath 64. Alternatively, liner feature 38 may be a channel that is undercut with respect to inner liner surface 50, and shaft feature 40 may be a ridge that is undercut with respect to outer shaft surface 66 or outer sheath surface 68. Such liner features 38 and/or shaft features 40 with one or more undercut edges may be configured to further restrict rotation of grip sleeve 12 and grip liner 24 with respect to shaft 14, and/or may tighten or increase the force of the engagement between liner feature 38 and shaft feature 40. In addition to the examples schematically represented in FIGS. 5 and 6, a channel and corresponding ridge may instead have sidewalls that are at an obtuse angle relative to the adjacent surface. Such liner features 38 and/or shaft features 40 may be configured to more easily facilitate alignment and frictional sliding between liner feature 38 and shaft feature 40, while at the same time still restricting relative rotation between grip liner 24 and shaft 14 when liner feature 38 and shaft feature 40 are fully and operatively mated.

Turning now to FIGS. 7-25, illustrative non-exclusive examples of grip assemblies 10, kits 140, and/or components thereof are illustrated. Where appropriate, the reference numerals from the schematic illustrations of FIGS. 1-6 are used to designate corresponding parts in FIGS. 7-25; however, the examples of FIGS. 7-25 are non-exclusive and do not limit grip assemblies 10 to the illustrated embodiments. That is, grip assemblies 10 are not limited to the specific embodiments of the illustrated examples of FIGS. 7-25 and may incorporate any number of the various aspects, configurations, characteristics, properties, etc. of grip assemblies 10 that are illustrated in and discussed with reference to the schematic representations of FIGS. 1-6 and/or the embodiments of FIGS. 7-25, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each embodiment or schematic illustration, however, it is within the scope of the present disclosure that the previously discussed features, variants, etc. may be utilized with other embodiments.

Figure 7:
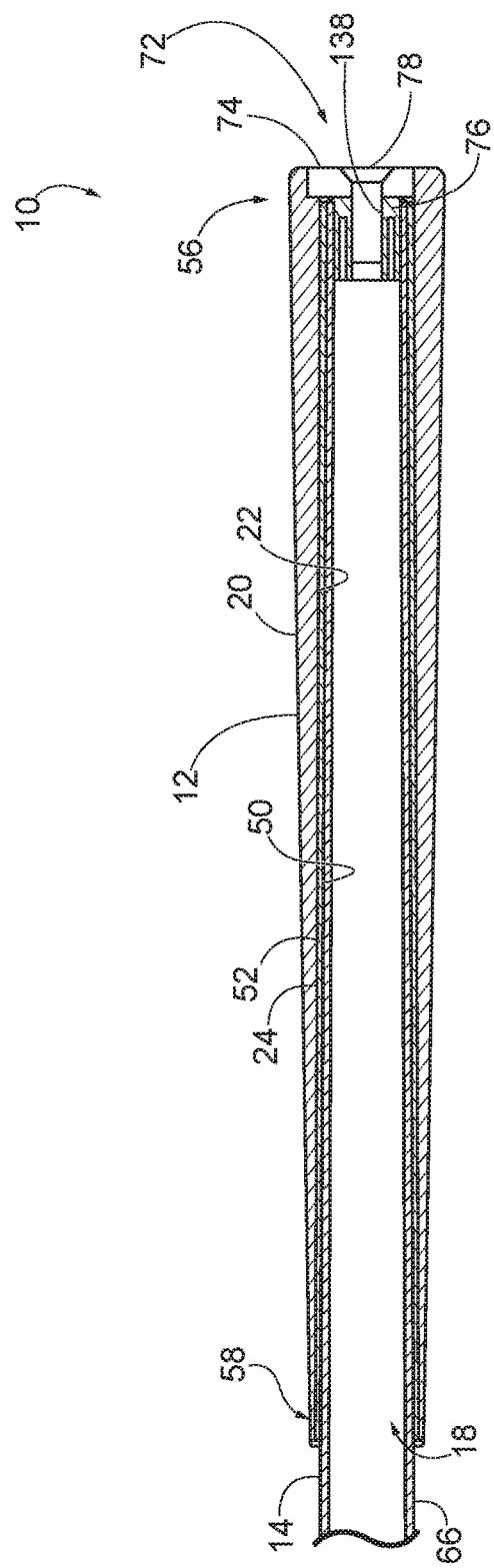
FIG. 7 is a cross-sectional view of one example of a grip assembly according to the present disclosure, positioned on a shaft.

FIG. 7 illustrates a cross-sectional area of an example of grip assembly 10 positioned on shaft 14, with grip liner 24 positioned interiorly to grip sleeve 12 (e.g., between grip sleeve 12 and shaft 14). As shown in FIG. 7, a portion of shaft 14 is positioned within interior space 18 of grip assembly 10 (though in some examples, the entire shaft 14 may be positioned within interior space 18). Inner liner surface 50 of grip liner 24 is positioned adjacent outer shaft surface 66 (though may be adjacent outer sheath surface 68 of a shaft sheath 64, in some examples). Outer grip surface 20 of grip sleeve 12 faces outward from grip assembly 10 for engagement by a user. While grip sleeve 12 may be relatively conforming (or tightly fit onto) to shaft 14, grip sleeve 12 is further secured to shaft 14 via securement mechanism 72 in this example. As shown, fastener 78 extends through sleeve collar 74 installed within butt end region 56 of grip sleeve 12, and then fastener 78 is threaded into a threaded hole 138 formed in shaft plug 76 (with shaft plug 76 being fixed within shaft 14).

Figure 8:
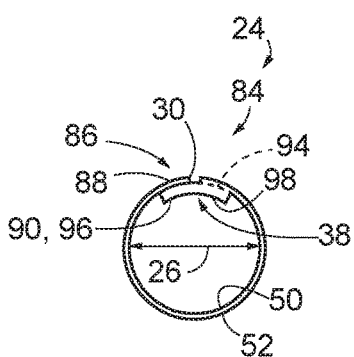
FIG. 8 is a schematic, cross-sectional view of one example of a grip liner for presently disclosed grip assemblies, the grip liner including a liner feature in the form of a ridge.
Figure 9:
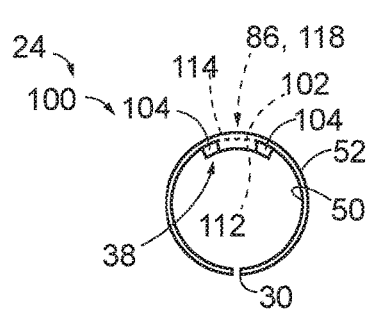
FIG. 9 is a schematic, cross-sectional view of another example of a grip liner for presently disclosed grip assemblies, the grip liner including a liner feature in the form of a ridge.
Figure 10:
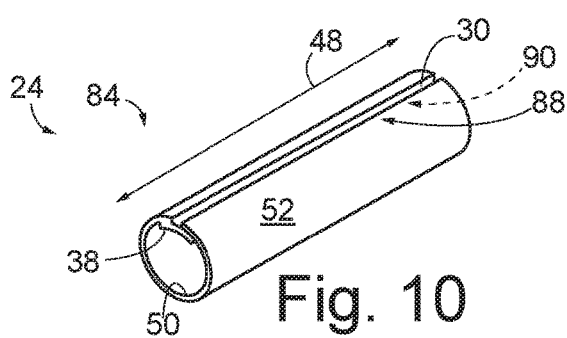
FIG. 10 is a perspective view of an example of a grip liner for presently disclosed grip assemblies, the grip liner including a liner feature in the form of a ridge.
Figure 14:
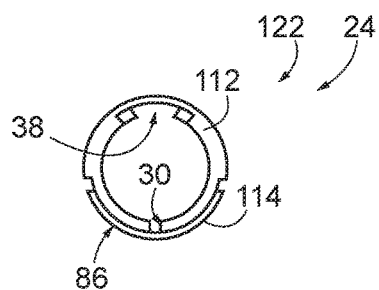
FIG. 14 is a schematic, cross-sectional view of another example of a grip liner for presently disclosed grip assemblies, the grip liner including a liner feature in the form of a channel.
Figure 15:
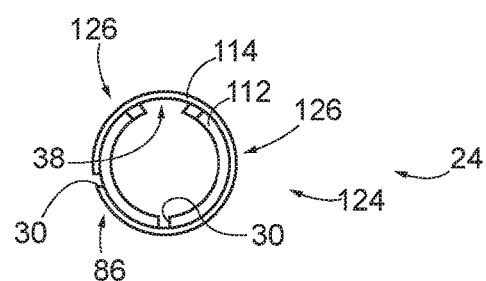
FIG. 15 is a schematic, cross-sectional view of another example of a grip liner for presently disclosed grip assemblies, the grip liner including a liner feature in the form of a channel.
Figure 16:
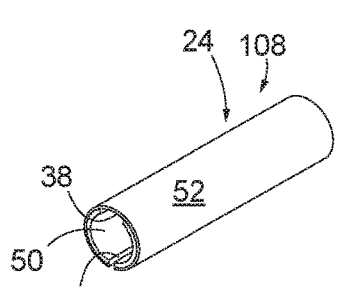
FIG. 16 is a perspective view of an example of a grip liner for presently disclosed grip assemblies, the grip liner including a liner feature in the form of a channel.

FIGS. 8-16 illustrate examples of grip liner 24, in both cross-section (FIGS. 8-9 and 11-15) and perspective views (FIGS. 10 and 16). FIGS. 8-10 illustrate examples of grip liner 24 with a liner feature 38 in the form of a ridge (e.g., projecting radially inwardly from inner liner surface 50), whereas FIGS. 11-16 illustrate examples of grip liner 24 with a liner feature 38 in the form of a channel formed into inner liner surface 50.

FIG. 8 illustrates a grip liner 84, which is an example of grip liner 24. In this example, liner feature 38 is a ridge that projects radially inward from inner liner surface 50 (e.g., extends from inner liner surface 50 of grip liner 24). Grip liner 84 also includes discontinuity 30 that extends longitudinally (e.g., along length 48, as indicated in FIG. 10). Grip liner 84 includes an area of overlap 86 where a first portion 88 of grip liner 84 overlaps with a second portion 90 of grip liner 84. As grip liner 84 expands towards the expanded conformation, first portion 88 moves with respect to second portion 90, thus widening discontinuity 30 to accommodate radial expansion of grip liner 84. Put another way, a first portion 98 of liner feature 38 may be fixed with respect to inner liner surface 50, while a second portion 96 of liner feature 38 may not be attached to inner liner surface 50 such that first portion 88 of grip liner 84 moves with respect to second portion 96 of liner feature 38 when grip liner 84 expands towards the expanded conformation. In the example of grip liner 84, discontinuity 30 overlaps liner feature 38, though discontinuity 30 may be positioned anywhere circumferentially about grip liner 84.

As in all examples described herein, liner feature 38 may be tapered along the length of grip liner 84, or may be of a substantially constant width (as schematically illustrated in FIGS. 3-4). Liner feature 38 may have edges that are undercut, or there may be no undercuts such that liner feature 38 edges may be normal to outer liner surface 52 (as schematically illustrated in FIGS. 5-6). Grip liner 84 may be formed of a single integral piece of material in some examples, while in other examples, grip liner 84 may be formed of a plurality of layers, as indicated by dashed line 94. For example, liner feature 38 may be integrally formed with the rest of grip liner 84, or liner feature 38 may be adhered to or otherwise coupled to inner liner surface 50. Grip liner 84 is shown in perspective view in FIG. 10.

In contrast to grip liner 84 of FIG. 8 (in which discontinuity 30 overlaps liner feature 38), FIG. 9 illustrates a grip liner 100 (which is an example of grip liner 24) where discontinuity 30 is circumferentially spaced apart from liner feature 38. As grip liner 100 expands towards the expanded conformation, discontinuity 30 widens to accommodate such expansion. Liner feature 38 is positioned essentially opposite from discontinuity 30 in grip liner 100, though the two may be positioned anywhere about the circumference of grip liner 100 with respect to one another. Similar to grip liner 84 of FIG. 8, grip liner 100 may be formed of a single integral piece of material, or, as indicated by dashed line 102, may be formed of multiple layers, such as by adhering, depositing, or otherwise coupling liner feature 38 to grip liner 100. In some examples, liner feature 38 (e.g., the ridge-shaped liner feature 38 of grip liner 100) is formed by an area of overlap 86 between a first layer 112 and a second layer 114 of grip liner 100. Additionally or alternatively, liner feature 38 may correspond to or be formed by an area 118 of increased thickness (such as formed by the overlap of multiple layers, or just an area of increased thickness as compared to surrounding adjacent areas of a single layer). Grip liner 100 is shown as tapered (e.g., narrower at one end of liner feature 38 than at the opposite end), as indicated generally at 104. While part of liner feature 38 of grip liner 84 of FIG. 8 was not attached to inner liner surface 50, in the example of grip liner 100 of FIG. 9, all of liner feature 38 is fixed with respect to inner liner surface 50.

Figure 11:
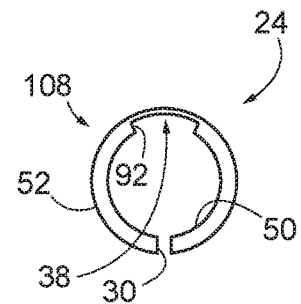
FIG. 11 is a schematic, cross-sectional view of one example of a grip liner for presently disclosed grip assemblies, the grip liner including a liner feature in the form of a channel.
Figure 12:
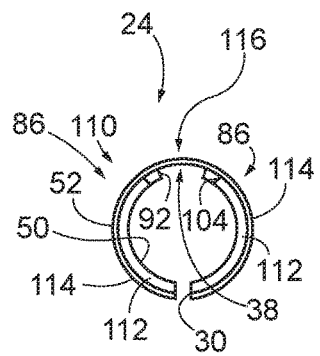
FIG. 12 is a schematic, cross-sectional view of another example of a grip liner for presently disclosed grip assemblies, the grip liner including a liner feature in the form of a channel.
Figure 13:
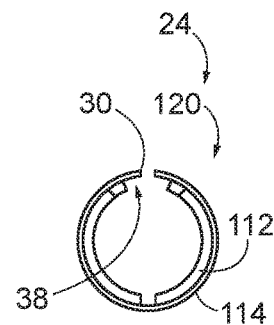
FIG. 13 is a schematic, cross-sectional view of another example of a grip liner for presently disclosed grip assemblies, the grip liner including a liner feature in the form of a channel.

FIG. 11 shows an example of a grip liner 108 (which is an example of grip liner 24) with a liner feature 38 in the form of a channel. Edges 92 of liner feature 38 may be straight edges (e.g. normal to outer liner surface 52), as illustrated, or may be undercut edges. Grip liner 108 is shown in perspective view in FIG. 16. FIG. 12 shows an example of a grip liner 110 (which is another example of grip liner 24) that is similar to grip liner 108 of FIG. 11, except that grip liner 110 includes a plurality of layers rather than being integrally formed or molded of a single piece of material. As shown in FIG. 12, liner feature 38 of grip liner 110 is formed between spaced apart regions 86 of overlap between a first layer 112 of grip liner 110 and a second layer 114 of grip liner 110. In this manner, liner feature 38 is a channel formed by a decreased thickness portion 116 of grip liner 110. In the example of grip liner 110, first layer 112 is substantially fixed with respect to second layer 114, with expansion of grip liner 110 being facilitated by expansion of discontinuity 30 (in the form of a gap or slit formed along grip liner 110), though in other examples, portions or all of respective layers may be free to move with respect to one another during expansion and contraction of the grip liner between the resting and expanded conformations. In some examples of grip liners 24 having multiple layers (e.g., grip liner 110 with first layer 112 and second layer 114), only one of the plurality of layers is coupled to grip sleeve 12 (e.g., to inner grip surface 22 of grip sleeve 12 of FIGS. 1-2). For example, adhesive may be applied to a portion of second layer 114 (e.g., along a portion of outer liner surface 52) to adhere grip liner 110 (or another example of grip liner 24) within grip sleeve 12 of grip assembly 10. FIG. 13 shows grip liner 120 (which is another example of grip liner 24), which is similar to grip liner 110 of FIG. 12, except that discontinuity 30 is positioned such that it overlaps liner feature 38.

FIGS. 14-15 illustrate other multi-layered grip liners 24, in the forms of grip liner 122 (FIG. 14) and grip liner 124 (FIG. 15), each having first layer 112 and second layer 114, and each with one or more discontinuities 30 and a channel-shaped liner feature 38. In FIG. 14, liner feature 38 of grip liner 122 is formed in first layer 112, while in FIG. 15, liner feature 38 of grip liner 124 is formed by a portion of second layer 114 overlapping a space between respective portions of first layer 112. In each of grip liner 122 and grip liner 124, first layer 112 and second layer 114 are free to move with respect to one another (e.g., when the grip liners expand towards the expanded conformation) in areas 86 of overlap between the layers. In grip liner 122, each of first layer 112 and second layer 114 is coupled to the inner grip surface 22 of grip sleeve 12, and an elongate slit forms discontinuity 30 in first layer 112. Accordingly, first layer 112 is configured to radially expand and slide relative to second layer 114 when grip liner 122 expands and contracts between the expanded conformation and the resting conformation. However, in grip liner 124 in portion 126 of overlap, first layer 112 and second layer 114 are fixed with respect to one another (e.g., adhered or otherwise coupled together), and two discontinuities 30 are formed.

Figure 17:
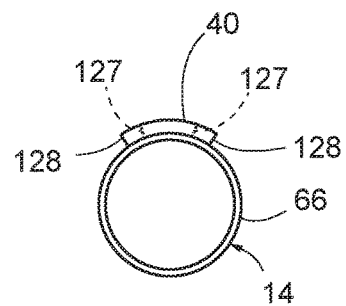
FIG. 17 is a schematic, cross-sectional view of an example of a shaft feature for grip assemblies according to the present disclosure, the shaft feature being in the form of a ridge.
Figure 18:
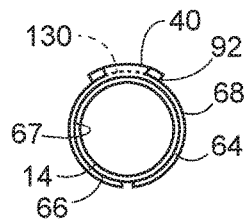
FIG. 18 is a schematic, cross-sectional view of another example of a shaft feature for presently disclosed grip assemblies, the shaft feature being in the form of a ridge.
Figure 19:
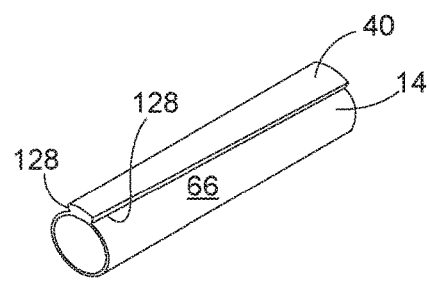
FIG. 19 is a perspective view of a tapered shaft feature integrally formed with the shaft, the shaft feature being in the form of a ridge.
Figure 20:
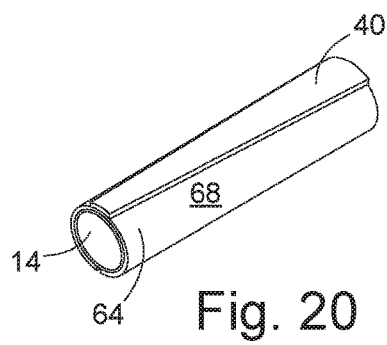
FIG. 20 is a perspective view of an example of a shaft sheath including a shaft feature, applied to a shaft, the shaft feature being in the form of a ridge.
Figure 21:
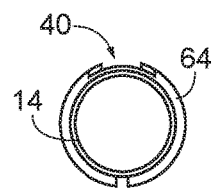
FIG. 21 is a schematic cross-sectional view of one example of a shaft sheath on a shaft, the shaft sheath including a shaft feature in the form of a channel.
Figure 22:
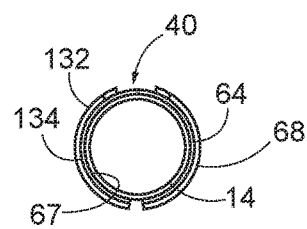
FIG. 22 is a schematic cross-sectional view of another example of a shaft sheath on a shaft, the shaft sheath including a shaft feature in the form of a channel.
Figure 23:
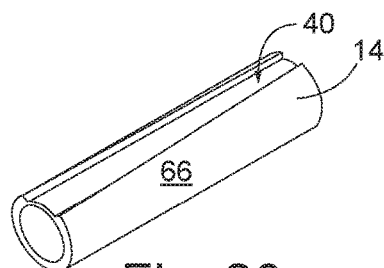
FIG. 23 is a perspective view of an example of a shaft feature integrally formed into a shaft according to the present disclosure, the shaft feature being in the form of a channel.

FIGS. 17-23 illustrate examples of shaft feature 40 and/or shaft sheath 64, in both cross-section (FIGS. 17-18 and 21-22) and perspective views (FIGS. 19-20 and 23). FIGS. 17-20 illustrate examples of a shaft feature 40 in the form of a ridge (e.g., projecting radially outwardly from shaft 14 or from outer sheath surface 68 of shaft sheath 64), whereas FIGS. 21-23 illustrate examples of shaft feature 40 in the form of a channel formed into shaft 14 or outer sheath surface 68 of shaft sheath 64. Ridge-shaped shaft features 40 (FIGS. 17-20) are configured to mate with corresponding channel-shaped liner features 38 as shown in FIGS. 11-16, whereas channel-shaped shaft features 40 (FIGS. 21-23) are configured to mate with corresponding ridge-shaped liner features 38 as shown in FIGS. 8-10.

FIG. 17 illustrates an example of shaft feature 40 in the form of a ridge, or projection, extending radially outward from outer shaft surface 66 of shaft 14. As indicated by dashed lines 127 in FIG. 17 (and more clearly visualized in FIG. 19), shaft feature 40 may be tapered such that its width varies along the length of shaft feature 40. FIG. 17 illustrates a standalone shaft feature 40 that is applied directly to shaft 14. For example, an adhesive-backed shaft feature 40 may be adhered to shaft 14. In other examples, shaft feature 40 may be deposited onto shaft 14, or otherwise coupled to shaft 14. In some examples, and as shown in FIG. 19, shaft feature 40 may be integrally formed into shaft 14. FIG. 19 shows a tapered shaft feature 40 integrally formed with shaft 14. In all examples described herein, edges 128 of shaft feature 40 may be undercut, or may be normal to the surface from which they extend (e.g., may be normal to outer shaft surface 66 of shaft 14). Shaft feature 40 could, for example, be configured to mate with liner feature 38 of FIG. 11, or any other liner feature 38 in the form of a suitable and corresponding channel described herein.

FIG. 18 illustrates a cross-section of one example of shaft sheath 64 having shaft feature 40, with shaft sheath 64 wrapped around shaft 14 (e.g., inner sheath surface 67 of shaft sheath 64 is adhered or otherwise coupled to outer shaft surface 66). Shaft feature 40 is in the form of a ridge extending radially outward from outer sheath surface 68 of shaft sheath 64 in this example, with shaft sheath 64 being formed of one or more layers of material. In some examples, and as indicated by dashed line 130, shaft feature 40 may be formed by two or more layers of shaft sheath 64 overlapping one another in the area of shaft feature 40. FIG. 20 illustrates an example of shaft sheath 64 secured to shaft 14, with shaft sheath 64 substantially surrounding the entire circumference of shaft 14 in this example. In other examples, shaft sheath 64 may extend around only a portion of shaft 14. As best seen in FIGS. 19-20, shaft feature 40 generally extends both longitudinally along shaft 14, and circumferentially about shaft 14.

FIGS. 21-23 illustrate examples of channel-shaped shaft features 40, with FIGS. 21-22 illustrating examples of shaft feature 40 formed in shaft sheath 64 applied to shaft 14, and FIG. 23 illustrates a channel-shaped shaft feature 40 formed directly in shaft 14 (e.g., recessed into the surface of shaft 14). FIG. 21 illustrates an example of a single-layer shaft sheath 64, whereas FIG. 22 illustrates an example of a multi-layer shaft sheath 64 applied to shaft 14, having an outer sheath layer 132 and an inner sheath layer 134. In FIG.

22, shaft feature 40 (in the form of a channel) is formed by a break, or gap, in outer sheath layer 132.

Figure 24:
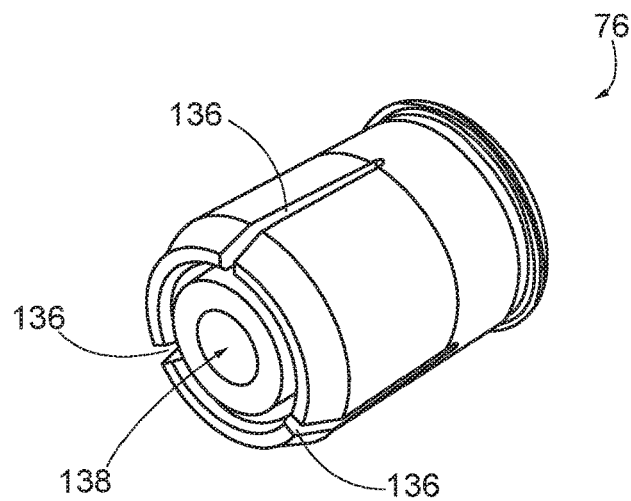
FIG. 24 is a perspective view of one example of a shaft plug for a securement mechanism for presently disclosed grip assemblies.

FIG. 24 illustrates an example of shaft plug 76, which may form part of a securement mechanism for securing grip sleeve 10 to shaft 14 (e.g., securement mechanism 72 of FIG. 2). Shaft plug 76 may be configured to be inserted into one end of shaft 14. In some examples, shaft plug 76 includes a plurality of longitudinally-extending splits 136 that facilitate compression of shaft plug 76 when shaft plug 76 is inserted within a shaft (e.g., shaft 14). Such an arrangement may ensure a friction or interference fit between shaft plug 76 and shaft 14, such that shaft plug 76 may be fixed within shaft 14. Additionally or alternatively, shaft plug 76 may be adhered within shaft 14, integrally formed with shaft 14, or otherwise coupled within shaft 14. Shaft plug 76 includes a threaded hole 138 for engagement by a fastener (e.g., fastener 78 of FIG. 2). Such fastener may be used to secure grip sleeve 12 onto shaft 14, by engaging the fastener with grip sleeve 12 (e.g., via sleeve collar 74 of FIG. 2) and engaging corresponding threads of the fastener within threaded hole 138 of shaft plug 76.

Figure 25:
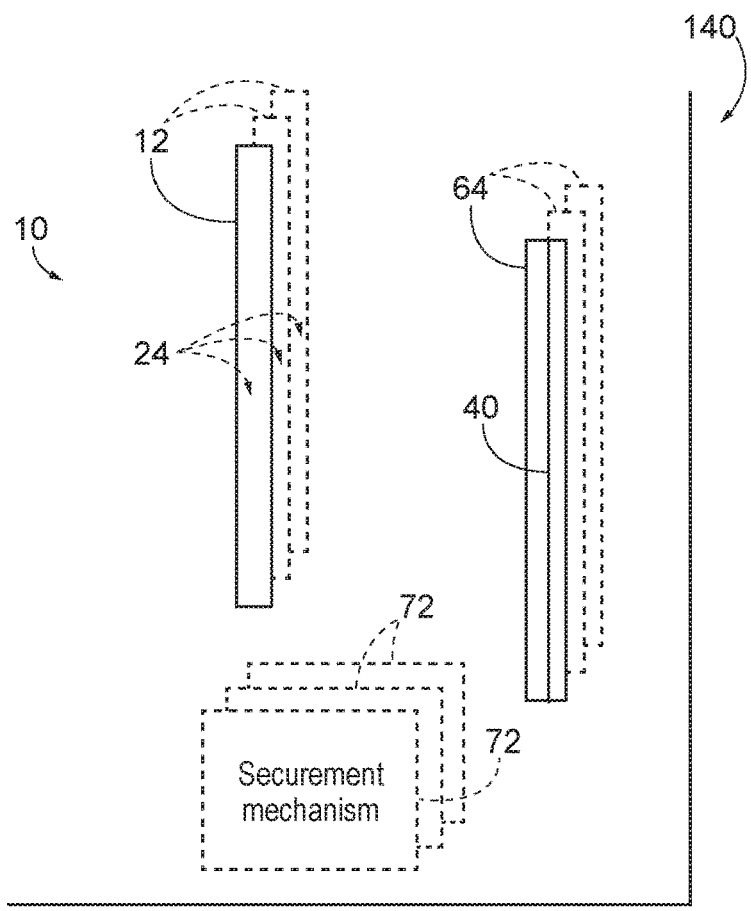
FIG. 25 is a schematic representation of non-exclusive examples of kits including grip assemblies according to the present disclosure.

FIG. 25 illustrates examples of a kit 140 for retrofitting shaft 14 with a selectively removable grip sleeve 12 according to the present disclosure. Kits 140 include one or more grip assemblies 10 (e.g., one or more grip sleeves 12, each with a respective grip liner 24 secured therein), along with one or more corresponding shaft sheaths 64. Each shaft sheath 64 selectively may be placed onto shaft 14 in order to associate shaft feature 40 of shaft sheath 64 with the golf club shaft. Each shaft sheath 64 may include an alignment guide (e.g., alignment guide 70 of FIG. 2) that is configured to facilitate proper alignment of shaft sheath 64 with respect to shaft 14, and thus facilitate a desired position of shaft feature 38 with respect to shaft 14, such that ultimately the mating of liner feature 40 with shaft feature 38 results in a desired orientation of grip sleeve 12 with respect to shaft 14. In examples where shaft sheath 64 is an adhesive-backed film, shaft sheath 64 may be adhered to the golf club shaft, thereby coupling shaft sheath 64 (and the associated shaft feature 40) to the golf club shaft. Kits 140 may be configured to retrofit existing golf clubs with a replaceable grip sleeve according to the present disclosure, without substantially impacting the weight of the golf club, in some examples. For example, a first weight of the original golf club (e.g., with a conventional grip attached thereto) may be within less than 1% of a second weight of the same golf club with grip assembly 10 secured thereto, in place of its conventional grip.

In some examples, kit 140 includes one or more securement mechanisms 72 for securing grip sleeves 12 to a golf club shaft. Kits 140 may include a plurality of identical grip sleeves 12, and/or kits 140 may include a plurality of different types of grip sleeves 12 (e.g., grip sleeves of different shape, sizes, and/or materials or textures). Similarly, kits 140 may include a plurality of identical shaft sheaths 64, and/or kits 140 may include a plurality of different types of shaft sheaths 64 (e.g., with different types of shaft features 40, of different sizes, shapes, and/or materials, etc.).

While examples herein have been described in terms of grip assemblies for golf clubs (e.g., replaceable grip sleeves for golf club shafts), presently disclosed grip assemblies may be configured for other applications as well. For example, presently disclosed grip assemblies may be used as a hand grip or sports grip with any shock-imparting implements and/or any recreational or industrial equipment, such as racquet handles, paddle handles, sports sticks (e.g., hockey, lacrosse, cricket, croquet, pool cues, walking, polo), bats, bicycle handles, weight machines, poles (e.g., ski, trekking), fishing rods, tools, firearms, or any other bars, handles, or shafts in any field.

Figure 26:
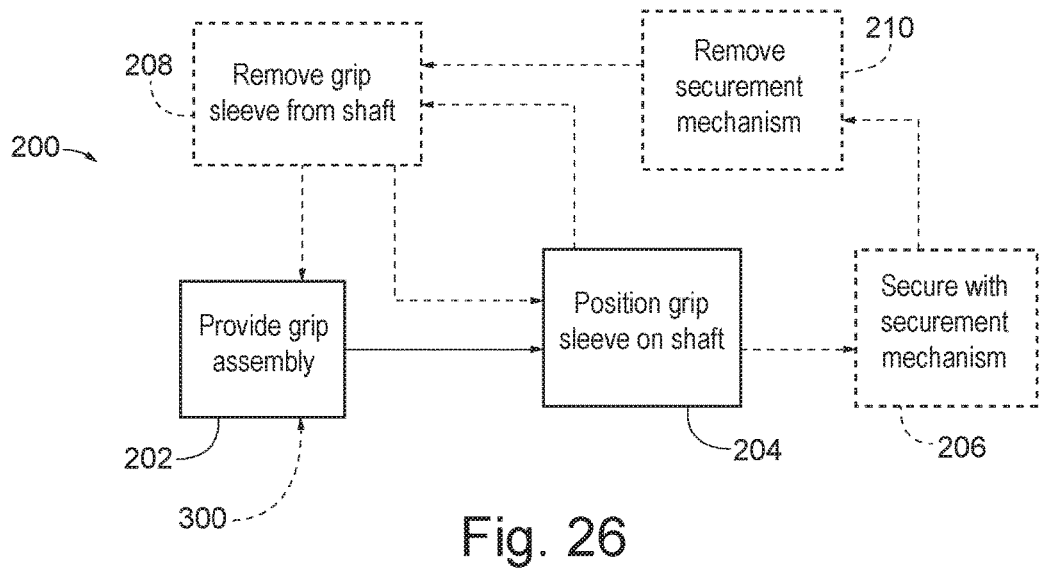
FIG. 26 is a flowchart diagram of methods of applying presently disclosed grip assemblies to a shaft.
Figure 27:
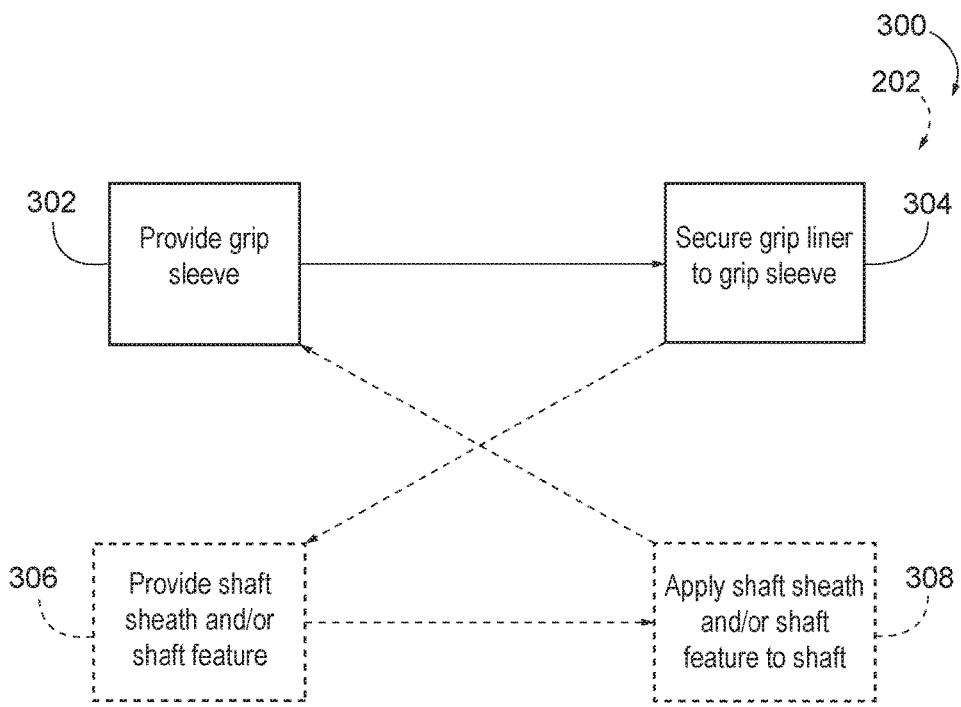
FIG. 27 is a flowchart diagram of methods of constructing grip assemblies according to the present disclosure.

FIGS. 26-27 schematically provide flowcharts that represent illustrative, non-exclusive examples of methods 200 for replacing a grip sleeve on a shaft (FIG. 26) and methods 300 for constructing or assembling a selectively replaceable grip assembly for a shaft (FIG. 27). In FIGS. 26-27, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 26-27 are not limiting and other methods and steps are within the scope of the present disclosure, including methods having greater than or fewer than the number of steps illustrated, as understood from the discussions herein.

FIG. 26 illustrates methods 200 of replacing a grip sleeve on a shaft, which methods 200 generally include providing a grip assembly (e.g., grip assembly 10) at 202 and positioning the grip sleeve of the grip assembly on the shaft (e.g., shaft 14), such as by inserting the shaft at least partially within an interior space of the grip sleeve (e.g., interior space 18 of grip sleeve 12) at 204. Providing the grip assembly at 202 may include providing one or more kits (e.g., kit 140) with a grip sleeve, grip liner, and shaft sheath for retrofitting a conventional golf club (or other shaft). In other examples, providing the grip assembly at 202 includes providing a grip sleeve and grip liner for use with a shaft that already includes a shaft feature associated therewith. Additionally or alternatively, providing the grip assembly at 202 may include one or more steps of method 300 of constructing or assembling one or more grip assemblies.

Positioning the grip sleeve on the shaft at 204 includes examples of selectively placing a removable grip sleeve according to the present disclosure onto a golf club shaft. Positioning the grip sleeve on the shaft at 204 is generally performed by hand, without the use of compressed air, solvents, or special tools. For example, one end of the grip assembly may be placed onto one end of the shaft, such that a liner feature of the grip liner (e.g., liner feature 38 of grip liner 24) engages the shaft feature associated with the shaft (e.g., shaft feature 40). Grip sleeve 12 and the associated grip liner may then be longitudinally slid further onto the shaft until the shaft is sufficiently inserted into the grip sleeve. In such positioning at 204, an inner liner surface of the grip liner (e.g., inner liner surface 50) may be longitudinally slid against an outer sheath surface of the shaft sheath (e.g., outer sheath surface 68) and/or against an outer shaft surface of the shaft (e.g., outer shaft surface 66). As the grip assembly is positioned onto the shaft, the grip liner may be expanded towards the expanded conformation, as the shaft exerts radial outward force onto the grip liner. This may especially be the case in examples where the shaft is frustoconical, or otherwise tapered. In these examples, the grip assembly may be tapered as well, in order to conform to the shaft once applied. Thus, the smallest end of the grip assembly must be inserted onto the largest end of the shaft in such examples, which is facilitated by expansion of the grip liner towards the expanded conformation.

In some methods 200, positioning the grip sleeve on the shaft at 204 includes aligning a shaft sheath (e.g., shaft sheath 64) and/or the grip sleeve with respect to the shaft, such as by using an alignment guide (e.g., alignment guide 70). For example, an alignment guide may be visible on the shaft or shaft sheath to serve as a reference point such that the shaft sheath and/or the grip sleeve can be positioned on the shaft in the desired orientation. Some methods 200 include securing the grip sleeve to the shaft using a securement mechanism (e.g., securement mechanism 72) at 206.

The grip sleeve may be selectively removed from the shaft at 208, after which the grip sleeve (or a different grip sleeve) may be positioned on the shaft again at 204. In some methods 200, the securement mechanism may be removed at 210 prior to removing the grip sleeve from the shaft at 208. The securement mechanism may again be secured at 206 after placement of another grip sleeve at 204. In this manner, the grip sleeve may be selectively removed from the shaft, such as when the grip sleeve is worn or damaged or when otherwise desired, without damaging the grip sleeve or shaft, and in a more timely fashion than conventional techniques of removing conventional grip sleeves.

Methods 300 of constructing, or assembling, a selectively replaceable grip assembly for a shaft, are shown in FIG. 27. As noted above in connection with FIG. 26, one or more steps of methods 300 may be performed to provide the grip assembly at 202 for methods 200. Methods 300 generally include providing a grip sleeve (e.g., grip sleeve 12) at 302, and securing a grip liner (e.g., grip liner 24) to the grip sleeve at 304. Providing the grip sleeve at 302 may include providing any of the grip assemblies, components thereof, and/or kits disclosed herein. Securing the grip liner to the grip sleeve at 304 generally includes securing the grip liner adjacent an inner grip surface (e.g., inner grip surface 22) of the grip sleeve such that a portion of the grip liner is fixed with respect to the inner grip surface. Generally, only a portion of the grip liner (which may be substantially tubular in overall shape in the resting conformation) is fixed to the inner grip surface of the grip sleeve, to allow for expansion of the grip liner towards the expanded conformation while within the grip sleeve. Such expansion of the grip liner towards the expanded conformation may push outwardly on the grip sleeve, aiding in positioning the grip assembly on the shaft.

Some methods 300 also include providing a shaft sheath (e.g., shaft sheath 64) and/or shaft feature (e.g., shaft feature 40) at 306. For example, providing the shaft sheath at 306 may include providing a shaft sheath including the shaft feature. Alternatively, providing the shaft feature at 306 may include providing a shaft having a shaft feature associated therewith, or providing a shaft feature that is configured to be coupled to the shaft. Further, methods 300 may include applying the shaft sheath and/or shaft feature to the shaft at 308. For example, applying the shaft sheath at 308 may include coupling the shaft sheath to the shaft. Alternatively, applying the shaft feature at 308 may include coupling the shaft feature to the shaft. Applying the shaft sheath and/or shaft feature at 308 may include adhering an inner sheath surface (e.g., inner sheath surface 67 of shaft sheath 64) to the shaft. Applying the shaft sheath and/or shaft feature to the shaft at 308 may be performed with respect to a conventional shaft, such as a conventional golf club shaft, so that the golf club shaft is compatible with presently disclosed grip assemblies. In some methods 300, providing the grip sleeve at 302 further includes providing a securement mechanism (e.g., securement mechanism 72) configured to secure the grip sleeve to the shaft via one or more fasteners or other components (e.g., sleeve collar 74 and/or shaft plug 76).

Illustrative, non-exclusive examples of grip assemblies, kits, golf clubs, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A grip assembly, the grip assembly comprising:
 a grip sleeve, wherein the grip sleeve defines an interior space and is configured to be selectively positioned on a shaft such that a portion of the shaft is within the interior space and further configured to be selectively removed from the shaft, wherein the grip sleeve comprises an outer grip surface for engagement by a user and an inner grip surface opposite the outer grip surface and that faces the interior space, and wherein the grip sleeve is constructed of a resilient material; and
 a grip liner positioned adjacent the inner grip surface of the grip sleeve, wherein the grip liner is substantially tubular in overall shape, wherein at least a portion of the grip liner is fixed to the inner grip surface of the grip sleeve, wherein the grip liner is configured to radially expand, in response to an outward radial force exerted on the grip liner, from a resting conformation to an expanded conformation, and wherein the grip liner comprises:
  a discontinuity that extends longitudinally along a longitudinal axis of the grip liner, wherein the discontinuity facilitates radial expansion and contraction of the grip liner between the resting conformation and the expanded conformation; and
  a liner feature that extends longitudinally along the longitudinal axis of the grip liner, wherein the liner feature is configured to mate with a corresponding shaft feature associated with the shaft and restrict rotation of the grip sleeve relative to the shaft when the shaft is positioned within the interior space and when the liner feature and the shaft feature are mated.

A1.1. The grip assembly of paragraph A1, wherein only a portion of the grip liner is fixed to the inner grip surface of the grip sleeve.

A2. The grip assembly of paragraph A1 or A1.1, wherein one of the liner feature and the shaft feature is a ridge, and the other of the liner feature and the shaft feature is a channel.

A3. The grip assembly of any of paragraphs A1-A2, wherein the grip assembly is a grip assembly for a golf club and wherein the shaft is a golf club shaft.

A4. The grip assembly of any of paragraphs A1-A3, wherein the grip assembly is a grip assembly for a sports club or sports stick.

A5. The grip assembly of any of paragraphs A1-A4, wherein the shaft is a handle for athletic equipment.

A6. The grip assembly of any of paragraphs A1-A5, wherein the grip assembly is configured to substantially prevent rotation of the grip sleeve with respect to the shaft when the grip sleeve is positioned on the shaft.

A7. The grip assembly of any of paragraphs A1-A6, wherein the discontinuity comprises a plurality of circumferentially spaced-apart discontinuities.

A8. The grip assembly of any of paragraphs A1-A7, wherein the discontinuity comprises a longitudinal slit between a first portion and a second portion of the grip liner.

A8.1. The grip assembly of any of paragraphs A1-A8, wherein the discontinuity extends from a first liner end of the grip liner to a second liner end of the grip liner, the second liner end being opposite the first liner end.

A8.2. The grip assembly of any of paragraphs A1-A8, wherein the discontinuity extends only partially along a length between a first liner end of the grip liner and a second liner end of the grip liner, the second liner end being opposite the first liner end.

A9. The grip assembly of any of paragraphs A1-A8.2, wherein the liner feature is a single liner feature.

A10. The grip assembly of any of paragraphs A1-A9, wherein the liner feature overlaps the discontinuity.

A11. The grip assembly of any of paragraphs A1-A9, wherein the liner feature is circumferentially spaced apart from the discontinuity.

A12. The grip assembly of any of paragraphs A1-A11, wherein the liner feature is a channel formed in the grip liner.

A13. The grip assembly of paragraph A12, wherein the channel is formed between spaced apart regions of overlap between a first layer and a second layer of the grip liner.

A14. The grip assembly of any of paragraphs A12 or A13, wherein the channel is formed by a decreased thickness portion of the grip liner.

A15. The grip assembly of any of paragraphs A1-A11, wherein the liner feature is a ridge extending from the grip liner.

A16. The grip assembly of paragraph A15, wherein the ridge is formed by a region of overlap between a first layer and a second layer of the grip liner.

A17. The grip assembly of paragraph A15 or A16, wherein the ridge is formed by an increased thickness portion of the grip liner.

A18. The grip assembly of any of paragraphs A1-A17, wherein the grip liner comprises an outer liner surface opposite an inner liner surface, wherein at least a portion of the outer liner surface is coupled to the inner grip surface of the grip sleeve, and wherein the liner feature is formed or positioned on the inner liner surface of the grip liner.

A19. The grip assembly of any of paragraphs A1-A18, wherein the liner feature is tapered such that a liner feature width of the liner feature continuously decreases between a first liner feature end and a second liner feature end opposite the first liner feature end.

A19.1. The grip assembly of paragraph A19, wherein the first liner feature end corresponds with a/the first liner end, and wherein the second liner feature end corresponds with a/the second liner end.

A20. The grip assembly of any of paragraphs A1-A19.1, wherein the grip liner is integrally formed with the grip sleeve.

A21. The grip assembly of any of paragraphs A1-A19.1, wherein the grip liner is adhered to the inner grip surface of the grip sleeve via an adhesive such that the adhesive allows expansion of the grip liner to the expanded conformation.

A22. The grip assembly of any of paragraphs A1-A21, wherein the grip liner comprises a/the first layer and a/the second layer.

A23. The grip assembly of paragraph A22, wherein an/the adhesive is applied to only one of the first layer and the second layer, to adhere the grip liner to the inner grip surface of the grip sleeve.

A24. The grip assembly of any of paragraphs A1-A23, wherein the grip liner comprises a semi-rigid or rigid material.

A25. The grip assembly of any of paragraphs A1-A24, wherein the grip liner comprises a shape memory material.

A26. The grip assembly of any of paragraphs A1-A25, wherein the grip liner comprises polyethylene terephthalate (PET), polyethylene (PE), polypropylene (PP), polyvinyl chloride (PVC), and/or polyethylene terephthalate glycol-modified (PETG).

A27. The grip assembly of any of paragraphs A1-A26, wherein the grip liner comprises a liner material that biases the grip liner toward the resting conformation.

A28. The grip assembly of any of paragraphs A1-A27, wherein the grip liner extends along substantially an entire sleeve length of the grip sleeve, from within a butt end region of the grip sleeve to within a tapered end region of the grip sleeve, the tapered end region being opposite the butt end region.

A29. The grip assembly of any of paragraphs A1-A27, wherein the grip liner extends along a portion of a sleeve length of the grip sleeve.

A30. The grip assembly of any of paragraphs A1-A29, wherein the shaft feature is tapered such that a shaft feature width of the shaft feature continuously decreases between a first shaft feature end and a second shaft feature end opposite the first shaft feature end. A31. The grip assembly of any of paragraphs A1-A30, wherein the shaft feature is a single shaft feature.

A32. The grip assembly of any of paragraphs A1-A31, wherein the shaft feature comprises a channel.

A33. The grip assembly of any of paragraphs A1-A31, wherein the shaft feature comprises a ridge.

A34. The grip assembly of any of paragraphs A1-A33, wherein the shaft feature is integrally formed with the shaft.

A35. The grip assembly of paragraph A34, wherein the shaft feature is formed by a decreased thickness portion of the shaft.

A36. The grip assembly of paragraph A34, wherein the shaft feature is formed by an increased thickness portion of the shaft.

A37. The grip assembly of any of paragraphs A1-A33, further comprising a shaft sheath comprising the shaft feature.

A38. The grip assembly of paragraph A37, wherein the shaft feature is formed by a region of overlap between a first layer and a second layer of the shaft sheath.

A39. The grip assembly of any of paragraphs A37 or A38, wherein the shaft feature is formed between spaced apart regions of overlap between a/the first layer and a/the second layer of the shaft sheath.

A40. The grip assembly of any of paragraphs A37-A39, wherein the shaft feature is formed by a decreased thickness portion of the shaft sheath.

A41. The grip assembly of any of paragraphs A37-A39, wherein the shaft feature is formed by an increased thickness portion of the shaft sheath.

A42. The grip assembly of any of paragraphs A37-A41, wherein the shaft sheath is positioned adjacent the shaft such that an inner sheath surface is coupled to the shaft.

A43. The grip assembly of any of paragraphs A37-A42, wherein the shaft sheath is positioned interiorly to the grip sleeve when the grip sleeve is positioned on the shaft.

A44. The grip assembly of any of paragraphs A37-A43, wherein the shaft sheath comprises an adhesive-backed film.

A45. The grip assembly of any of paragraphs A37-A44, wherein the shaft feature is provided on an outer sheath surface of the shaft sheath, the outer sheath surface being opposite an/the inner sheath surface.

A46. The grip assembly of any of paragraphs A37-A45, wherein the shaft sheath has a thickness of less than about 0.001 inches, less than about 0.01 inches, less than about 0.025 inches, and/or less than about 0.1 inches.

A47. The grip assembly of any of paragraphs A37-A46, wherein the shaft sheath is flexible such that it is configured to conform to the shaft.

A48. The grip assembly of any of paragraphs A37-A41 wherein the shaft sheath is integrally formed with the shaft.

A49. The grip assembly of any of paragraphs A37-A48, wherein the shaft sheath further comprises an alignment guide for aligning the shaft sheath with the shaft.

A50. The grip assembly of paragraph A49, wherein the alignment guide is encapsulated between layers of the shaft sheath.

A51. The grip assembly of any of paragraphs A37-A50, wherein the shaft sheath comprises ultra-high molecular weight polyethylene (UHMW PE).

A52. The grip assembly of any of paragraphs A37-A51, wherein the shaft sheath comprises a material selected to limit friction between an/the outer sheath surface and the inner liner surface of the grip liner.

A52.1. The grip assembly of paragraph A52, wherein a coefficient of friction between the outer sheath surface and the inner liner surface is less than 0.7, less than 0.5, less than 0.4, less than 0.3, less than 0.2, less than 0.1, and/or less than 0.05.

A53. The grip assembly of any of paragraphs A37-A52.1, wherein a shaft sheath material of which the shaft sheath is composed is different from a grip liner material of which the grip liner is composed.

A54. The grip assembly of any of paragraphs A1-A53, wherein the shaft feature is rectangular.

A55. The grip assembly of any of paragraphs A1-A53, wherein the shaft feature is wedge-shaped.

A56. The grip assembly of any of paragraphs A1-A55, wherein the shaft feature extends longitudinally and circumferentially.

A57. The grip assembly of any of paragraphs A1-A56, further comprising a securement mechanism configured to secure the grip sleeve to the shaft.

A58. The grip assembly of paragraph A57, wherein the securement mechanism comprises a sleeve collar associated with the grip sleeve.

A59. The grip assembly of paragraph A58, wherein the sleeve collar is rigid and positioned within a/the butt end region of the grip sleeve.

A60. The grip assembly of any of paragraphs A57-A59, wherein the securement mechanism comprises a threaded shaft plug positioned and secured within the shaft.

A61. The grip assembly of any of paragraphs A57-A60, wherein a/the sleeve collar of the securement mechanism is configured to engage a/the threaded shaft plug within the shaft via a fastener positioned through a/the sleeve collar and the threaded shaft plug, and wherein the securement mechanism further comprises the fastener.

A62. The grip assembly of any of paragraphs A57-A61, wherein a/the threaded shaft plug comprises a plurality of longitudinally-extending splits.

A63. The grip assembly of any of paragraphs A57-A62, wherein a/the threaded shaft plug is configured to be compressed by the shaft when the threaded shaft plug is positioned within the shaft, thereby ensuring a friction fit within the shaft such that the threaded shaft plug is fixed within the shaft.

A64. The grip assembly of any of paragraphs A1-A63, wherein the shaft is frustoconical.

A65. The grip assembly of any of paragraphs A1-A64, wherein the grip sleeve is configured to be selectively positioned on a second shaft after it is selectively removed from the shaft.

A66. The grip assembly of any of paragraphs A1-A65, wherein the grip sleeve is configured to be selectively re-placed on the shaft after it is selectively removed from the shaft.

A67. The grip assembly of any of paragraphs A1-A66, wherein the grip assembly is configured such that the grip sleeve is undamaged after selective removal from the shaft.

A68. The grip assembly of any of paragraphs A1-A67, wherein the grip sleeve is configured to be selectively positioned on and removed from the shaft by hand, without the use of compressed air, special tools, or solvents.

A69. The grip assembly of any of paragraphs A1-A68, wherein the grip sleeve comprises an elastic material.

A70. The grip assembly of any of paragraphs A1-A69, wherein the grip sleeve is configured to direct a force radially inward towards the shaft when the grip sleeve is positioned on the shaft.

A71. The grip assembly of any of paragraphs A1-A70, wherein the grip sleeve is tapered such that a first grip sleeve diameter at a/the butt end region of the grip sleeve is larger than a second grip sleeve diameter at a/the tapered end region of the grip sleeve.

A72. The grip assembly of any of paragraphs A1-A71, further comprising the shaft.

A73. The grip assembly of any of paragraphs A1-A72, wherein an/the inner grip surface of the grip sleeve is tapered to correspond to the shaft, such that the inner grip surface has a non-constant inner diameter, and wherein an/the outer grip surface of the grip sleeve is not tapered, such that it has a substantially constant diameter along a/the sleeve length of the grip sleeve.

B1. A kit for retrofitting a golf club shaft of a golf club with a selectively removable grip sleeve, the kit comprising:
 the grip assembly of any of paragraphs A1-A73; and
 a/the shaft sheath configured to be positioned between the grip sleeve and the golf club shaft, wherein the shaft sheath is configured to be positioned adjacent the golf club shaft such that an/the inner sheath surface is coupled to the golf club shaft, wherein the shaft feature is provided on an/the outer sheath surface of the shaft sheath, the outer sheath surface being opposite the inner sheath surface.

B2. The kit of paragraph B1, wherein the kit is configured such that when the shaft feature of the shaft sheath is engaged with the liner feature of the grip liner, the grip sleeve is substantially prevented from rotating with respect to the golf club shaft.

B3. The kit of any of paragraphs B1-B2, wherein the kit is configured such that a first weight of the golf club having a conventional grip secured thereto is within less than 1% of a second weight of the golf club having the grip assembly and shaft sheath secured thereto.

B4. The kit of any of paragraphs B1-B3, further comprising a/the securement mechanism configured to secure the grip sleeve to the golf club shaft.

B5. The kit of any of paragraphs B1-B4, wherein the kit comprises a plurality of different grip sleeves, each of the plurality of different grip sleeves being configured to be selectively positioned on and removed from the golf club shaft via engagement with the shaft sheath on the golf club shaft.

B6. The kit of paragraph B5, wherein each respective grip sleeve of the plurality of different grip sleeves comprises a respective grip liner at least partially fixed within the respective grip sleeve.

B7. The kit of any of paragraphs B1-B6, wherein the shaft sheath comprises a plurality of shaft sheaths each configured to be positioned on a respective golf club shaft.

C1. A golf club, comprising:
the grip assembly of any of paragraphs A1-A73; and
a/the golf club shaft, wherein the shaft feature is associated with the golf club shaft, wherein the grip sleeve is positioned on the golf club shaft such that a portion of the golf club shaft is within the interior space defined by the grip sleeve and such that the liner feature of the grip assembly is engaged with the shaft feature, and wherein the grip liner is positioned adjacent the inner grip surface of the grip sleeve.

C2. The golf club of paragraph C1, wherein the golf club shaft comprises a/the shaft sheath.

C3. The golf club of any of paragraphs C1-C2, wherein a/the inner sheath surface of a/the shaft sheath is positioned on the golf club shaft, and a/the outer surface of the shaft sheath is engaged with an/the inner liner surface of the grip liner.

C4. The golf club of any of paragraphs C1-C3, wherein a/the shaft sheath is integrally formed with the golf club shaft.

C5. The golf club of any of paragraphs C1-C4, wherein a/the shaft sheath is coupled to the golf club shaft.

C6. The golf club of any of paragraphs C1-05, wherein the shaft feature is integrally formed with the golf club shaft.

C7. The golf club of any of paragraphs C1-C6, wherein a/the shaft sheath comprises the shaft feature.

C8. The golf club of any of paragraphs C1-C7, wherein the grip assembly is secured to the golf club shaft via a/the securement mechanism.

C9. The golf club of any of paragraphs C1-C8, wherein the golf club shaft is frustoconical.

D1. A method of replacing a grip sleeve on a shaft, the method comprising:
providing the grip assembly of any of paragraphs A1-A73; and
positioning the grip sleeve on the shaft.

D2. The method of paragraph D1, wherein the positioning the grip sleeve on the shaft comprises positioning the grip sleeve on a golf club shaft of a golf club.

D3. The method of any of paragraphs D1-D2, wherein the providing the grip assembly comprises providing the kit of any of paragraphs B1-B7.

D4. The method of any of paragraphs D1-D3, wherein the providing the grip assembly comprises providing a golf club shaft comprising the grip assembly of any of paragraphs A1-A73.

D5. The method of any of paragraphs D1-D4, wherein the positioning the grip sleeve is performed by hand, without the use of compressed air or solvents.

D6. The method of any of paragraphs D1-D5, wherein the positioning the grip sleeve comprises engaging the liner feature of the grip liner with the shaft feature of the shaft.

D7. The method of any of paragraphs D1-D6, wherein the positioning the grip sleeve comprises longitudinally sliding the grip sleeve with respect to the shaft.

D8. The method of any of paragraphs D1-D7, wherein the positioning the grip sleeve comprises sliding an/the inner liner surface of the grip liner against an/the outer sheath surface of a/the shaft sheath.

D9. The method of any of paragraphs D1-D8, wherein the positioning the grip sleeve comprises expanding the grip liner towards the expanded conformation.

D10. The method of any of paragraphs D1-D9, further comprising aligning the grip sleeve with respect to the shaft.

D11. The method of paragraph D10, wherein the aligning the grip sleeve comprises aligning the grip sleeve using an/the alignment guide of a/the shaft sheath.

D12. The method of any of paragraphs D1-D11, further comprising removing the grip sleeve from the shaft.

D13. The method of paragraph D12, further comprising removing a/the securement mechanism prior to the removing the grip sleeve from the shaft.

D14. The method of any of paragraphs D1-D13, further comprising positioning a second grip sleeve on the shaft.

D15. The method of any of paragraphs D1-D14, further comprising securing the grip sleeve to the shaft using a/the securement mechanism.

E1. A method of constructing a selectively replaceable grip assembly for a shaft, the method comprising:
providing a grip sleeve, wherein the grip sleeve defines an interior space and is configured to be selectively positioned on the shaft such that a portion of the shaft is within the interior space and is further configured to be selectively removed from the shaft, wherein the grip sleeve comprises an outer grip surface for engagement by a user and an inner grip surface opposite the outer grip surface and that faces the interior space, and wherein the grip sleeve is constructed of a resilient material; and
securing a grip liner adjacent the inner grip surface of the grip sleeve such that at least a portion of the grip liner is fixed with respect to the inner grip surface of the grip sleeve, wherein the grip liner is substantially tubular in overall shape, wherein only a portion of the grip liner is fixed to the inner grip surface of the grip sleeve, wherein the grip liner is configured to radially expand, in response to an outward radial force exerted on the grip liner, from a resting conformation to an expanded conformation, and wherein the grip liner comprises:
a discontinuity that extends longitudinally along a longitudinal axis of the grip liner, wherein the discontinuity facilitates radial expansion and contraction of the grip liner between the resting conformation and the expanded conformation; and
a liner feature that extends longitudinally along the longitudinal axis of the grip liner, wherein the liner feature is configured to mate with a corresponding shaft feature associated with the shaft and restrict rotation of the grip sleeve relative to the shaft when the shaft is positioned within the interior space and when the liner feature and the shaft feature are mated.

E2. The method of paragraph E1, wherein the shaft is a golf club shaft of a golf club.

E3. The method of any of paragraphs E1-E2, further comprising providing a shaft sheath comprising the shaft feature.

E4. The method of paragraph E3, further comprising applying the shaft sheath to the shaft.

E4.1. The method of paragraph E4, wherein the applying the shaft sheath to the shaft comprises aligning the shaft sheath with respect to the shaft using an alignment guide of the shaft sheath.

E5. The method of paragraph E4 or E4.1, wherein the applying the shaft sheath to the shaft comprises applying the shaft sheath to a conventional golf club shaft to retrofit the conventional golf club shaft with the selectively replaceable grip assembly.

E6. The method of any of paragraphs E4-E5, wherein the shaft sheath is an adhesive-backed film, and wherein the applying the shaft sheath to the shaft comprises adhering an inner sheath surface to the shaft.

E7. The method of any of paragraphs E3-E6 wherein the providing the shaft sheath comprises providing a golf club shaft comprising the shaft sheath.

E8. The method of any of paragraphs E1-E7, further comprising:
providing a securement mechanism; and
securing the grip sleeve to the shaft via the securement mechanism.

E9. The method of any of paragraphs E1-E8, wherein the providing the grip sleeve comprises providing the grip assembly of any of paragraphs A1-A73.

E10. The method of any of paragraphs E1-E9, wherein the providing the grip sleeve comprises providing the kit of any of paragraphs B1-B7.

F1. A shaft sheath configured for use on a shaft to engage a selectively removable and replaceable grip sleeve of a grip assembly.

F2. The shaft sheath of paragraph F1, wherein the grip assembly is the grip assembly of any of paragraphs A1-A73.

F3. The shaft sheath of any of paragraphs F1-F2, wherein the shaft sheath comprises a/the shaft feature configured to mate with a corresponding liner feature of the grip assembly, wherein the shaft feature extends longitudinally along a longitudinal axis of the shaft sheath, and wherein the shaft feature is configured to restrict rotation of the grip sleeve relative to the shaft when the liner feature and the shaft feature are mated.

F4. The shaft sheath of any of paragraphs F1-F3, wherein the shaft feature is formed by a region of overlap between a first layer and a second layer of the shaft sheath.

F5. The shaft sheath of any of paragraphs F1-F4, wherein the shaft feature is formed between spaced apart regions of overlap between a/the first layer and a/the second layer of the shaft sheath.

F6. The shaft sheath of any of paragraphs F1-F5, wherein the shaft feature is formed by a decreased thickness portion of the shaft sheath.

F7. The shaft sheath of any of paragraphs F1-F5, wherein the shaft feature is formed by an increased thickness portion of the shaft sheath.

F8. The shaft sheath of any of paragraphs F1-F7, wherein the shaft sheath is configured to be positioned adjacent the shaft such that an inner sheath surface of the shaft sheath is coupled to the shaft.

F9. The shaft sheath of any of paragraphs F1-F8, wherein the shaft sheath is configured to be positioned interiorly to the grip sleeve when the grip sleeve is positioned on the shaft.

F10. The shaft sheath of any of paragraphs F1-F9, wherein the shaft sheath comprises an adhesive-backed film.

F11. The shaft sheath of any of paragraphs F1-F10 wherein a/the shaft feature is provided on an outer sheath surface of the shaft sheath, the outer sheath surface being opposite an/the inner sheath surface of the shaft sheath.

F12. The shaft sheath of any of paragraphs F1-F11, wherein the shaft sheath is flexible such that it is configured to conform to the shaft.

F13. The shaft sheath of any of paragraphs F1-F12, wherein the shaft sheath further comprises an alignment guide for aligning the shaft sheath with the shaft.

F14. The shaft sheath of paragraph F13, wherein the alignment guide is encapsulated between layers of the shaft sheath.

F15. The shaft sheath of any of paragraphs F1-F14, wherein the shaft sheath comprises ultra-high molecular weight polyethylene (UHMW PE).

F16. The shaft sheath of any of paragraphs F1-F15, wherein the shaft sheath comprises a material selected to limit friction between an/the outer sheath surface and a/the grip liner of the grip assembly.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein the term "configured" mean that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A grip assembly, the grip assembly comprising:
   a grip sleeve, wherein the grip sleeve defines an interior space and is configured to be selectively positioned on a shaft such that a portion of the shaft is within the interior space and further configured to be selectively removed from the shaft, wherein the grip sleeve comprises an outer grip surface for engagement by a user and an inner grip surface opposite the outer grip surface and that faces the interior space, and wherein the grip sleeve is constructed of a resilient material; and
   a grip liner positioned adjacent the inner grip surface of the grip sleeve, wherein the grip liner is substantially tubular in overall shape and has a first liner end and a second liner end longitudinally opposite the first liner end, wherein at least a portion of the grip liner is fixed to the inner grip surface of the grip sleeve, wherein the grip liner is configured to radially expand, in response to an outward radial force exerted on the grip liner, from a resting conformation to an expanded conformation, and wherein the grip liner comprises:
      a discontinuity that extends longitudinally along a longitudinal axis of the grip liner, wherein the discontinuity facilitates radial expansion and contraction of the grip liner between the resting conformation and the expanded conformation; and
      a liner feature that extends longitudinally along the longitudinal axis of the grip liner from the second liner end toward the first liner end, wherein the liner feature is configured to mate with a corresponding shaft feature associated with the shaft and restrict rotation of the grip sleeve relative to the shaft when the shaft is positioned within the interior space and when the liner feature and the shaft feature are mated, and wherein the liner feature is configured to initially mate with the shaft feature at the second liner end as the shaft is selectively positioned within the interior space of the grip sleeve;
   wherein the liner feature is a channel and the shaft feature is a ridge;
   wherein the grip liner comprises a first layer and a second layer radially outward from the first layer;
   wherein the first layer has a first elongate slit separating a first layer first portion and a first layer second portion;
   wherein the first layer defines the channel between the first layer first portion and the first layer second portion spaced-away from the first elongate slit;
   wherein the second layer has a second elongate slit spaced-away from the first elongate slit;
   wherein the first layer first portion is fixed to the second layer on one side of the second elongate slit and is permitted to slide relative to the second layer on an opposite side of the second elongate slit;
   wherein the first layer second portion is fixed to the second layer;
   wherein the discontinuity is defined by the first elongate slit, the second elongate slit, and a region of overlap between the second layer and the first layer first portion on the opposite side of the second elongate slit;
   wherein when the grip liner expands from the resting conformation to the expanded conformation, the first layer first portion slides relative to the second layer and the first elongate slit and the second elongate slit widen; and
   wherein when the grip liner contracts from the expanded conformation to the resting conformation, the first layer first portion slides relative to the second layer and the first elongate slit and the second elongate slit contract in width.

2. The grip assembly according to claim 1, wherein the grip assembly is configured to substantially prevent rotation of the grip sleeve with respect to the shaft when the grip sleeve is positioned on the shaft.

3. The grip assembly according to claim 1, wherein the liner feature is a single liner feature.

4. The grip assembly according to claim 1, wherein the grip liner comprises an outer liner surface opposite an inner liner surface, wherein at least a portion of the outer liner surface is coupled to the inner grip surface of the grip sleeve, and wherein the liner feature is formed or positioned on the inner liner surface of the grip liner.

5. The grip assembly according to claim 1, wherein the liner feature is tapered such that a liner feature width of the liner feature continuously decreases from a second liner feature end at the second liner end to a first liner feature end toward the first liner end opposite the second liner feature end.

6. The grip assembly according to claim 5, wherein the shaft feature is tapered such that a shaft feature width of the shaft feature continuously decreases from a first shaft feature end to a second shaft feature end opposite the first shaft feature end, and wherein when the liner feature is mated with the shaft feature, the first shaft feature end is adjacent the second liner feature end and the second shaft feature end is adjacent the first liner feature end.

7. The grip assembly according to claim 1, wherein the grip liner comprises a semi-rigid or rigid material.

8. The grip assembly according to claim 1, further comprising a shaft sheath comprising the shaft feature, wherein the shaft sheath is positioned adjacent the shaft such that an inner sheath surface is coupled to the shaft, wherein the shaft sheath is flexible such that it is configured to conform to the shaft, and wherein the shaft sheath is positioned interiorly to the grip sleeve when the grip sleeve is positioned on the shaft.

9. The grip assembly according to claim 8, wherein the shaft sheath is an adhesive-backed film.

10. The grip assembly according to claim 9, wherein the adhesive-backed film comprises an inner layer that defines the inner sheath surface and an outer layer that defines the shaft feature, wherein the shaft sheath further comprises an alignment guide for aligning the liner feature with the shaft feature, and wherein the alignment guide is encapsulated between the inner layer and the outer layer of the shaft sheath.

11. The grip assembly according to claim 8, wherein the shaft sheath further comprises an alignment guide for aligning the shaft sheath with the shaft and aligning the liner feature with the shaft feature, wherein the alignment guide is encapsulated between layers of the shaft sheath.

12. The grip assembly according to claim 1, further comprising a securement mechanism configured to secure the grip sleeve to the shaft, wherein the securement mechanism comprises a sleeve collar associated with the grip sleeve, wherein the sleeve collar is rigid and positioned within a butt end region of the grip sleeve, wherein the securement mechanism comprises a threaded shaft plug positioned and secured within the shaft, and wherein the sleeve collar of the securement mechanism is configured to engage the threaded shaft plug within the shaft via a fastener positioned through the sleeve collar and the threaded shaft plug, and wherein the securement mechanism further comprises the fastener.

13. A kit for retrofitting a golf club shaft of a golf club with a selectively removable grip sleeve, the kit comprising:
the grip assembly according to claim 1; and
a shaft sheath configured to be positioned between the grip sleeve and the golf club shaft, wherein the shaft sheath is configured to be positioned adjacent the golf club shaft such that an inner sheath surface is coupled to the golf club shaft, wherein the shaft feature is provided on an outer sheath surface of the shaft sheath, the outer sheath surface being opposite the inner sheath surface, and wherein the shaft sheath is an adhesive-backed film.

14. The kit according to claim 13, wherein the kit comprises a plurality of different grip sleeves, each of the plurality of different grip sleeves being configured to be selectively positioned on and removed from the golf club shaft via engagement with the shaft sheath on the golf club shaft, and wherein each respective grip sleeve of the plurality of different grip sleeves comprises a respective grip liner at least partially fixed within the respective grip sleeve.

15. The kit according to claim 13, wherein the shaft sheath comprises a plurality of shaft sheaths each configured to be positioned on a respective golf club shaft.

16. A golf club, comprising:
the grip assembly according to claim 1; and
the shaft, wherein the shaft is a golf club shaft of the golf club, wherein the shaft feature is associated with the golf club shaft, wherein the grip sleeve is positioned on the golf club shaft such that a portion of the golf club shaft is within the interior space defined by the grip sleeve and such that the liner feature of the grip assembly is engaged with the shaft feature, and wherein the grip liner is positioned adjacent the inner grip surface of the grip sleeve.

17. A method of replacing a grip sleeve on a shaft, the method comprising:
providing the grip assembly according to claim 1; and
positioning the grip sleeve on the shaft, wherein the positioning the grip sleeve comprises engaging the liner feature of the grip liner with the shaft feature of the shaft and longitudinally sliding the grip sleeve with respect to the shaft.

18. The method according to claim 17, wherein the positioning the grip sleeve on the shaft comprises positioning the grip sleeve on a golf club shaft of a golf club.

19. The method according to claim 18, further comprising aligning the grip sleeve with respect to the shaft, wherein the aligning the grip sleeve comprises aligning the grip sleeve using an alignment guide of a shaft sheath of the grip assembly, wherein the shaft sheath comprises the shaft feature.

20. The method according to claim 17, further comprising:
removing the grip sleeve from the shaft; and
positioning a second grip sleeve on the shaft.

21. A method of constructing a selectively replaceable grip assembly for a shaft, the method comprising:
providing a grip sleeve, wherein the grip sleeve defines an interior space and is configured to be selectively positioned on the shaft such that a portion of the shaft is within the interior space and is further configured to be selectively removed from the shaft, wherein the grip sleeve comprises an outer grip surface for engagement by a user and an inner grip surface opposite the outer grip surface and that faces the interior space, and wherein the grip sleeve is constructed of a resilient material; and
securing a grip liner adjacent the inner grip surface of the grip sleeve such that at least a portion of the grip liner is fixed with respect to the inner grip surface of the grip sleeve, wherein the grip liner is substantially tubular in overall shape and has a first liner end and a second liner end longitudinally opposite the first liner end, wherein only a portion of the grip liner is fixed to the inner grip surface of the grip sleeve, wherein the grip liner is configured to radially expand, in response to an outward radial force exerted on the grip liner, from a resting conformation to an expanded conformation, and wherein the grip liner comprises:
a discontinuity that extends longitudinally along a longitudinal axis of the grip liner, wherein the discontinuity facilitates radial expansion and contraction of the grip liner between the resting conformation and the expanded conformation; and
a liner feature that extends longitudinally along the longitudinal axis of the grip liner from the second liner end toward the first liner end, wherein the liner feature is configured to mate with a corresponding shaft feature associated with the shaft and restrict rotation of the grip sleeve relative to the shaft when the shaft is positioned within the interior space and when the liner feature and the shaft feature are mated, and wherein the liner feature is configured to initially mate with the shaft feature at the second liner end as the shaft is selectively positioned within the interior space of the grip sleeve;

wherein the liner feature is a channel and the shaft feature is a ridge;

wherein the grip liner comprises a first layer and a second layer radially outward from the first layer;

wherein the first layer has a first elongate slit separating a first layer first portion and a first layer second portion;

wherein the first layer defines the channel between the first layer first portion and the first layer second portion spaced-away from the first elongate slit;

wherein the second layer has a second elongate slit spaced-away from the first elongate slit;

wherein the first layer first portion is fixed to the second layer on one side of the second elongate slit and is permitted to slide relative to the second layer on an opposite side of the second elongate slit;

wherein the first layer second portion is fixed to the second layer;

wherein the discontinuity is defined by the first elongate slit, the second elongate slit, and a region of overlap between the second layer and the first layer first portion on the opposite side of the second elongate slit;

wherein when the grip liner expands from the resting conformation to the expanded conformation, the first layer first portion slides relative to the second layer and the first elongate slit and the second elongate slit widen; and wherein when the grip liner contracts from the expanded conformation to the resting conformation, the first layer first portion slides relative to the second layer and the first elongate slit and the second elongate slit contract in width.

* * * * *